(12) United States Patent
Iguchi et al.

(10) Patent No.: US 11,609,311 B2
(45) Date of Patent: Mar. 21, 2023

(54) PULSED LIGHT IRRADIATION/DETECTION DEVICE, AND OPTICAL RADAR DEVICE

(71) Applicant: SHARP KABUSHIKI KAISHA, Sakai (JP)

(72) Inventors: Katsuji Iguchi, Sakai (JP); Noriaki Fujii, Sakai (JP); Hidenori Kawanishi, Sakai (JP); Koji Takahashi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 970 days.

(21) Appl. No.: 16/168,581

(22) Filed: Oct. 23, 2018

(65) Prior Publication Data
US 2019/0120943 A1   Apr. 25, 2019

(30) Foreign Application Priority Data

Oct. 24, 2017   (JP) .............................. JP2017-205599

(51) Int. Cl.
| | |
|---|---|
| *G01S 7/481* | (2006.01) |
| *G01S 17/08* | (2006.01) |
| *G01S 17/93* | (2020.01) |
| *G01S 17/89* | (2020.01) |
| *G01S 7/483* | (2006.01) |
| *G01S 7/499* | (2006.01) |

(52) U.S. Cl.
CPC ............ *G01S 7/4818* (2013.01); *G01S 7/483* (2013.01); *G01S 7/4811* (2013.01); *G01S 7/4817* (2013.01); *G01S 7/499* (2013.01); *G01S 17/08* (2013.01); *G01S 17/89* (2013.01); *G01S 17/93* (2013.01)

(58) Field of Classification Search
CPC ........ G01S 7/4818; G01S 7/483; G01S 7/499; G01S 7/4817; G01S 17/08; G01S 17/93; G01S 7/4811; G01S 17/89; G01S 7/481; G01S 17/02
See application file for complete search history.

(56) References Cited

U.S. PATENT DOCUMENTS

| | | | |
|---|---|---|---|
| 2005/0046821 A1* | 3/2005 | Hanson | ................... G01S 17/58 356/3.01 |
| 2007/0181810 A1 | 8/2007 | Tan et al. | |
| 2010/0020306 A1 | 1/2010 | Hall | |

(Continued)

FOREIGN PATENT DOCUMENTS

| | | | |
|---|---|---|---|
| CN | 102435995 A | 5/2012 | |
| DE | 3538062 C2 * | 6/1994 | ............... G01C 3/32 |

(Continued)

*Primary Examiner* — Isam A Alsomiri
*Assistant Examiner* — Sanjide Naser
(74) *Attorney, Agent, or Firm* — ScienBiziP, P.C.

(57) ABSTRACT

A pulsed light emitting element emits pulsed light that is linearly polarized in a first polarization direction, the pulsed light passes through a polarizing beam splitter and a lens in this order and is radiated onto a target object, reflected light passes through the lens and the polarizing beam splitter in this order, is linearly polarized in a second polarization direction that is different from the first polarization direction, and is concentrated on a light receiving element, the pulsed light emitting element and the light receiving element are provided on a focal plane of the lens, and the optical axis of the pulsed light and the optical axis of the reflected light overlap.

15 Claims, 19 Drawing Sheets

(56) References Cited

U.S. PATENT DOCUMENTS

| | | | |
|---|---|---|---|
| 2011/0216304 A1 | 9/2011 | Hall | |
| 2013/0206967 A1 | 8/2013 | Shpunt et al. | |
| 2015/0316650 A1 | 11/2015 | Imai | |
| 2015/0377696 A1 | 12/2015 | Shpunt et al. | |
| 2016/0245903 A1* | 8/2016 | Kalscheur | G01S 7/4814 |
| 2017/0131388 A1* | 5/2017 | Campbell | G01S 7/4812 |
| 2017/0176579 A1 | 6/2017 | Niclass et al. | |
| 2019/0011567 A1* | 1/2019 | Pacala | G01S 7/4815 |
| 2019/0129035 A1* | 5/2019 | Valouch | G01S 7/4815 |

FOREIGN PATENT DOCUMENTS

| | | |
|---|---|---|
| EP | 2811079 A1 | 12/2014 |
| JP | 11-63918 A | 3/1999 |
| JP | 2007-108129 A | 4/2007 |
| JP | 2007-214564 A | 8/2007 |
| JP | 2009-063339 A | 3/2009 |
| JP | 2009-103529 A | 5/2009 |
| JP | 2012-242218 A | 12/2012 |
| JP | 2014-234075 A | 12/2014 |
| JP | 2014235075 A | 12/2014 |
| JP | 2015-514965 A | 5/2015 |
| JP | 2015-212647 A | 11/2015 |
| JP | 2016-099213 A | 5/2016 |
| JP | 2016-161438 A | 9/2016 |
| WO | 2008/008970 A2 | 1/2008 |
| WO | 2011/146523 A2 | 11/2011 |

\* cited by examiner

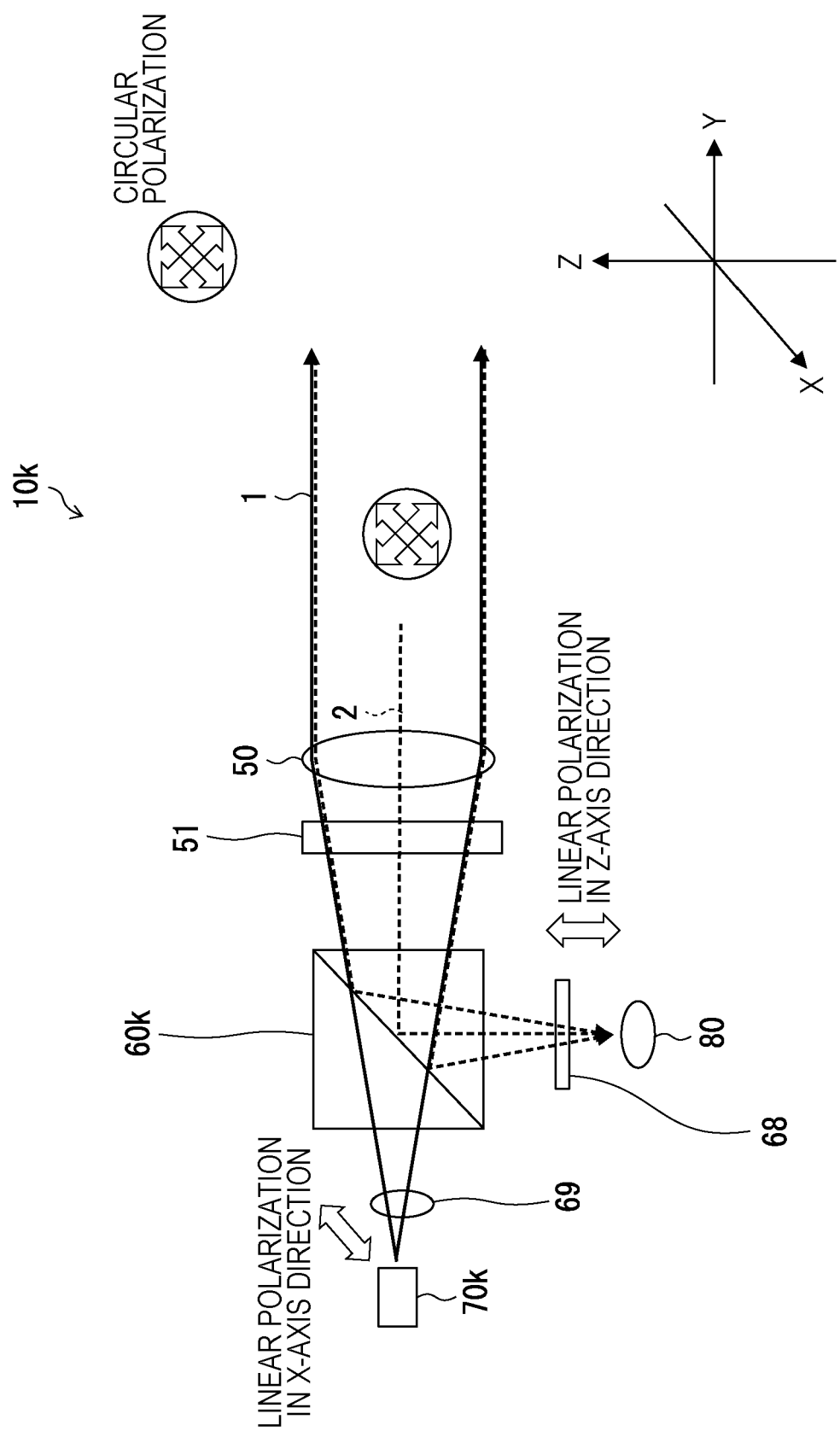

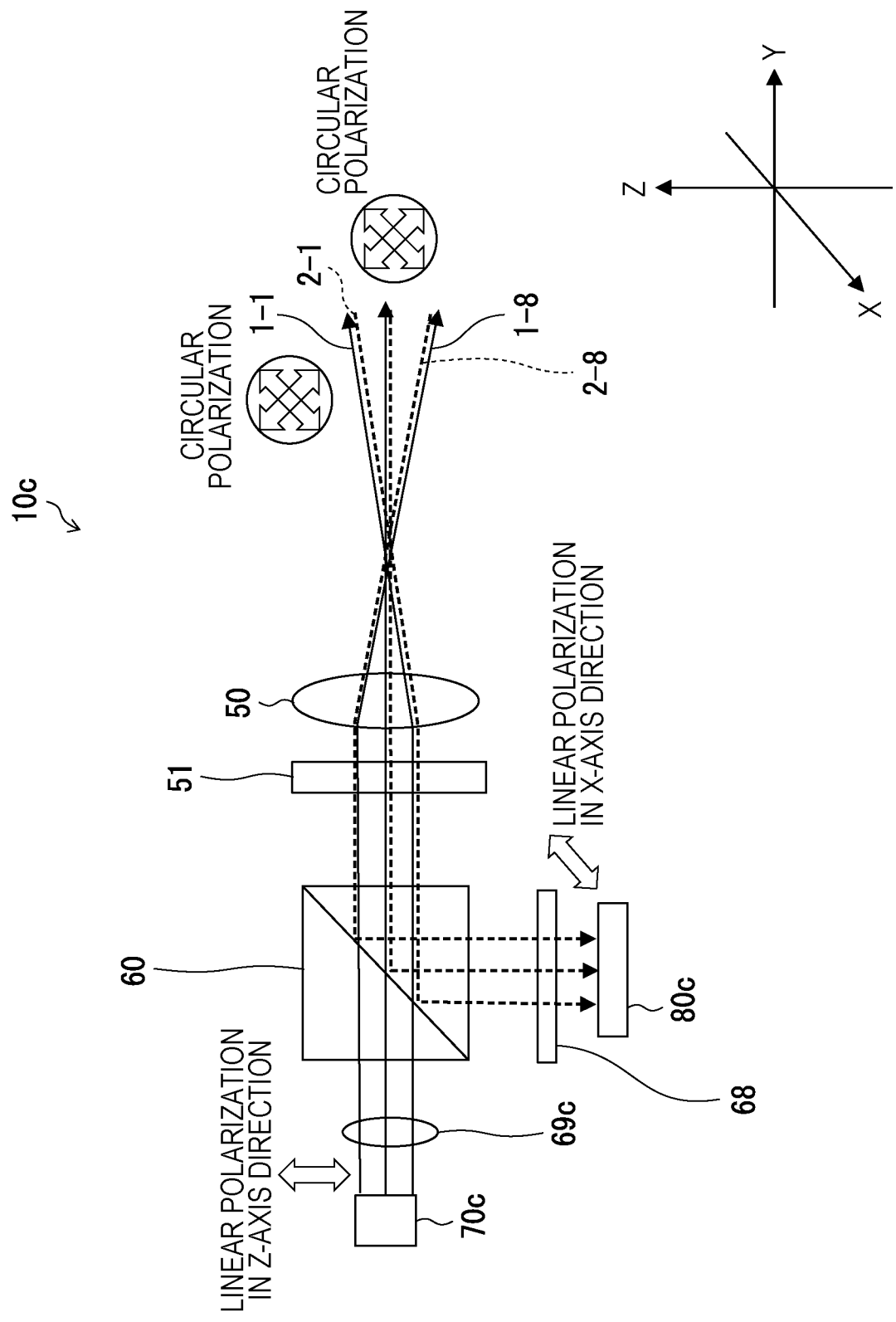

FIG. 8A
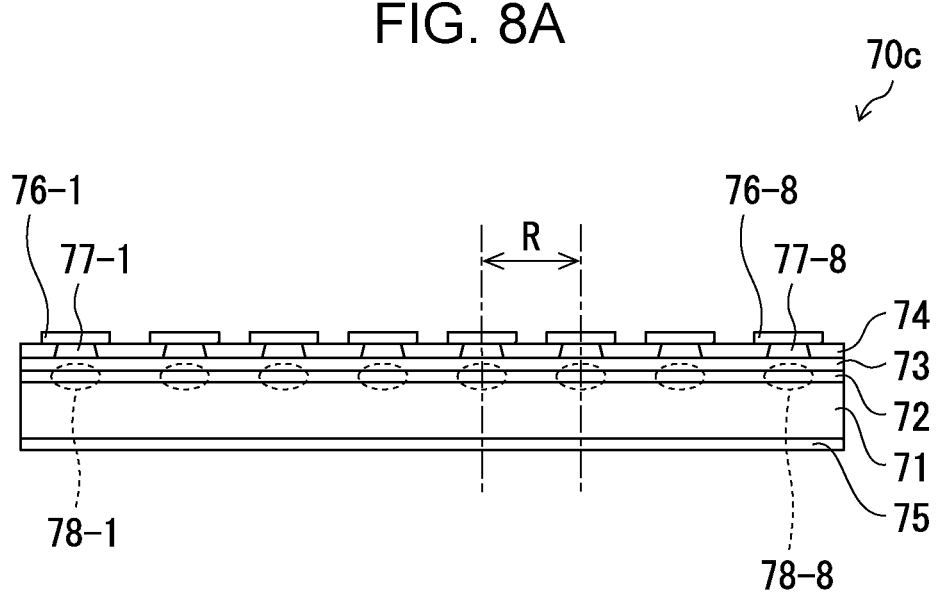
FIG. 8B
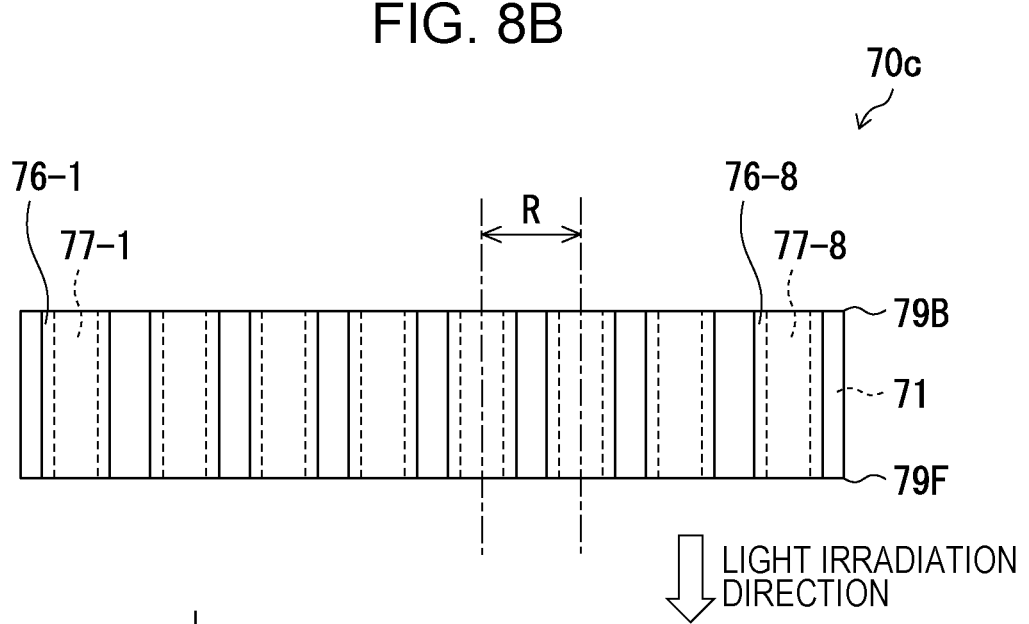
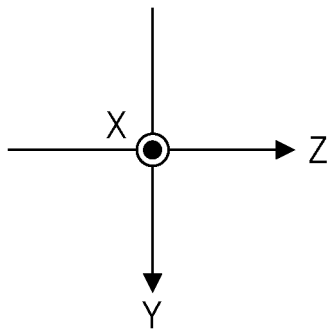

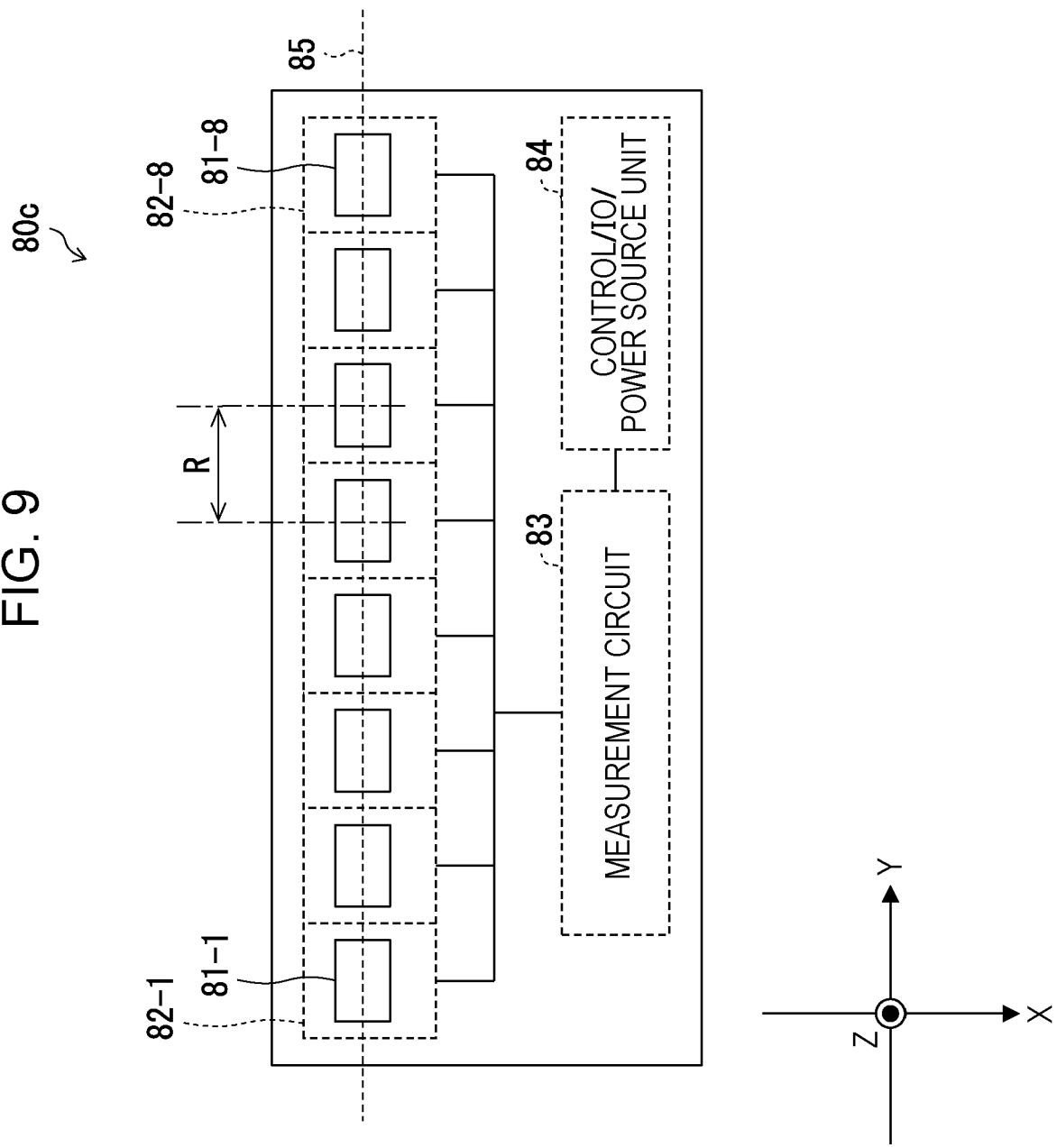

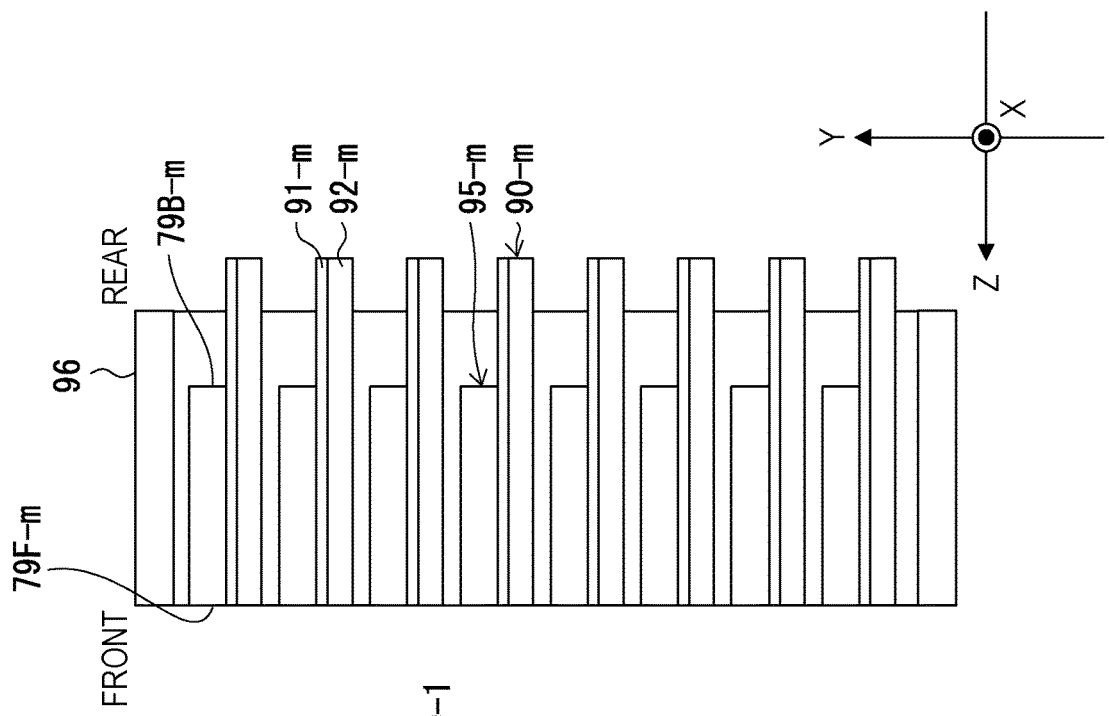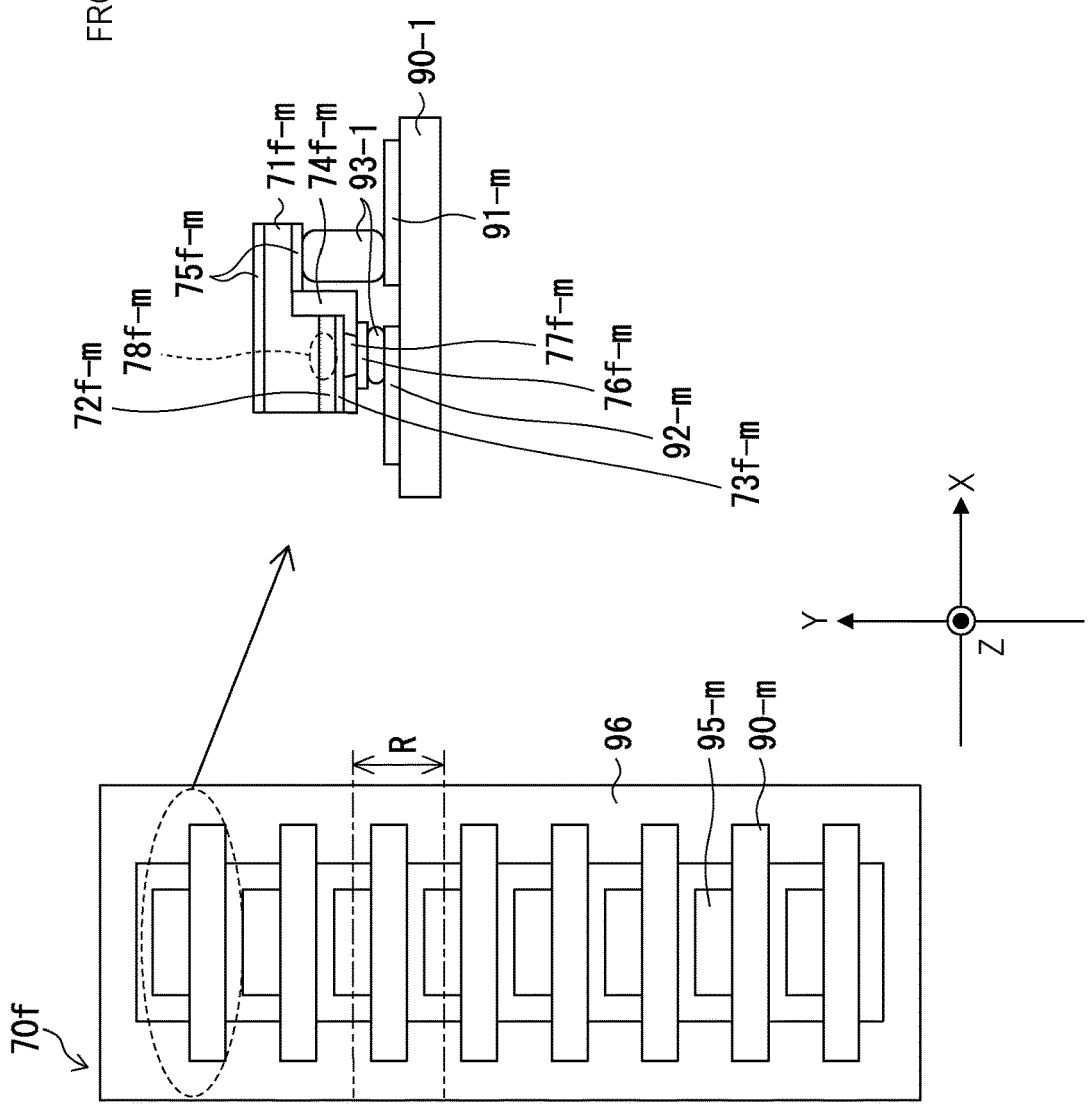

PULSED LIGHT IRRADIATION/DETECTION DEVICE, AND OPTICAL RADAR DEVICE

BACKGROUND

1. Field

The present disclosure relates to an optical radar device, and a pulsed light irradiation/detection device mounted in the optical radar device.

2. Description of the Related Art

A three-dimensional image is a concept that also includes information regarding the distance to a target object within the field of view in addition to a two-dimensional image such as an ordinary photograph, and, in recent years, applications have been spreading for peripheral recognition purposes for automobiles, robots, and the like. As a method for measuring highly precise distance information, a method is spreading in which laser light is radiated and the time-of-flight (ToF) for the laser light to reflect and return from a target object is measured.

As a method for radiating laser light toward the field of view, there is a rotary type in which a light receiving device is rotated as a single unit with a laser beam (spot beam) that is collimated in a substantially parallel manner and radiated in a narrow range (see international Publication. Nos. 2008/008970 and 2011/146523), a scanning type in which a spot beam is scanned using a mirror or the like (see Japanese Unexamined Patent Application Publication Nos. 2009-63339 and 2016-161438), and a collective irradiation type in which a laser beam is radiated widely in a substantially uniform manner across the entire field of view. The collective irradiation type does not require a mechanical mechanism and therefore a reduction in size easy; however, the laser light intensity on the target object becomes weak compared to the scanning type, and therefore, if the distance to the target object increases, the signal strength weakens and the distance measurement precision drops. In a case where a laser beam is shaped into a linear form and scanned in only one direction (see Japanese Unexamined Patent Application Publication No. 2016-161438), the light irradiation intensity improves compared to collective irradiation but a greater improvement is desirable. The spot beam scanning type in which it is easy to obtain a high beam intensity on the target object is often developed for devices having the purpose of measuring up to a long distance such as 50 to 200 m. At present, the rotary type is most often employed, in which a plurality of laser light sources and a plurality of one-to-one corresponding light receiving elements are used (see International Publication Nos. 2008/008970 and 2011/146523).

SUMMARY

However, in the related art mentioned above, there is an issue in that it is difficult to efficiently measure wide range of distance from the vicinity of an optical radar device to far away from it for the reasons described hereinafter.

An optical radar device generally radiates a laser onto a target object, uses reflected light therefrom to measure the time-of-flight (ToF), and measures the distance to the target object. Consequently, the light irradiation intensity on the surface of the target object inevitably decreases for distant target objects. In particular, in automobile applications, an optical radar device has to operate even under equatorial midday sunlight, and extending the maximum measurement distance under intense background light is an important issue. With this in mind, it is necessary to concentrate laser light on the target region to be measured, and to increase, even just slightly, the intensity ratio with respect to the background light, and the divergence of the spot beam has to be suppressed as much as possible.

As indicated in International Publication No. 2011/146523, in a case where a laser irradiation system and a light receiving system have separate optical systems, depending on the distance to the target object, so-called blind spots occur in locations where the optical axis of the light receiving system and the optical axis of the laser irradiation system do not overlap. International Publication No. 2011/146523 proposes forming a lens of a light receiving system and a lens of a laser irradiation system in D-shapes and bringing the distance between both lenses closer together, but a greater improvement is desirable. Generally, in order to suppress the occurrence of blind spots over a long distance, the divergence of the laser beam has to be increased and the irradiation region has to be expanded, which leads to a decrease in the laser irradiation intensity over a long distance, and the maximum measurement distance shortens. Furthermore, at short distances, reflected light from the target region irradiated with the laser does not form an image on the light receiving element, and therefore a special optical element (a lens, a reflective mirror, or the like) has to be prepared in such a way that the reflected light hits the light receiving element, which causes an increase in costs.

In addition, in a device that is based on International Publication. No. 2011/146523, in order to increase resolution in a vertical direction, 16 to 64 substrates (light emitting substrates) having laser elements mounted thereon are arranged and the same number of light receiving substrates corresponding one-to-one thereto are arranged. It is necessary for the optical axes of the light emitting substrates and the optical axes of the light receiving substrates to be individually aligned, and the substrates have to be manufactured and assembled with a very high degree of precision. Deviations exist even if manufactured correctly, and therefore the divergence of the laser beams has to be increased to a certain extent for it to be possible to perform measurement even if there is a slight deviation in the optical axes.

Meanwhile, Japanese Unexamined Patent Application Publication No. 2009-63339 discloses a configuration in which the optical axis of a light receiving system and the optical axis of a laser irradiation system align parallel to each other, for a case of one pair of light emitting element and light receiving element. Nevertheless, in this configuration, a light projecting optical system and a light receiving optical system are provided separately, and are connected with a light separation unit which covers optical path diameters of the two optical systems, and therefore the light separation unit becomes large. In particular, in order to extend the measurement distance up to a long distance, it is necessary to increase the lens diameter of the light receiving optical system, and the light separation unit has to have a size that covers the diameter of the optical path of this large light receiving optical system. In addition, since the light projecting optical system and the light receiving optical system are provided separately, there are issues in that there is an increase in manufacturing costs because of increase of optical components and adjustment elements, and it also becomes difficult to reduce the overall size.

An aspect of the present disclosure suppresses the occurrence of blind spots, and increases the intensity of light radiated onto a target object, with few optical components and regardless of the distance to the target object.

In order to solve the aforementioned problems, a pulsed light irradiation/detection device according to an aspect of the present disclosure is provided with: an imaging optical element; a polarizing beam splitter; a pulsed light emitting element; and a light receiving element, pulsed light being radiated toward a target object and reflected light from the target object being received, in which the pulsed light emitting element emits pulsed light that is linearly polarized in a first polarization direction, the pulsed light passes through the polarizing beam splitter and the imaging optical element in this order, and is radiated onto the target object, the reflected light passes through the imaging optical element and the polarizing beam splitter in this order, is linearly polarized in a second polarization direction that is different from the first polarization direction, and is focused on the light receiving element, the pulsed light emitting element and the light receiving element are provided on a focal plane of the imaging optical element, and the optical axis of the pulsed light and the optical axis of the reflected light overlap.

BRIEF DESCRIPTION OF THE DRAWINGS

FIG. 6 is a schematic drawing depicting a pulsed light irradiation/detection unit according to embodiment 5 of the present disclosure;

FIG. 7 is a schematic drawing depicting a configuration of a pulsed light irradiation/detection unit forming part of an optical radar device according to embodiment 6 of the present disclosure;

FIGS. 8A and 8B are schematic drawings depicting a pulsed light emitting element forming part of the pulsed light irradiation/detection unit according to embodiment 6 of the present disclosure;

FIG. 9 is a schematic drawing depicting a light receiving element forming part of the pulsed light irradiation/detection unit according to embodiment 6 of the present disclosure;

FIGS. 14A, 14B, and 14C are schematic drawings depicting a configuration pertaining to a pulsed light emitting element according to embodiment 9 of the present disclosure;

DESCRIPTION OF THE EMBODIMENTS

Figure 1:
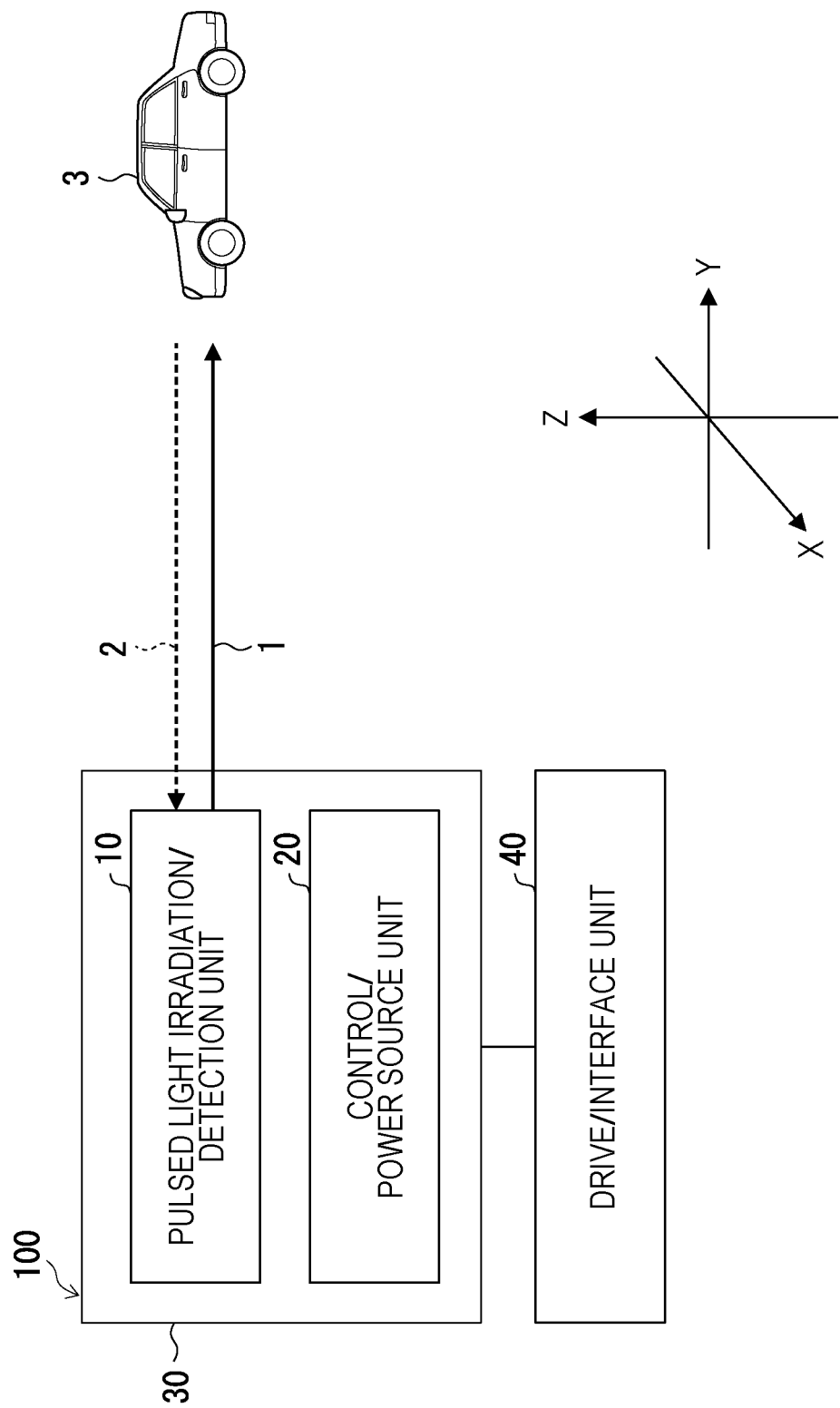
FIG. 1 is a schematic drawing depicting a configuration of an optical radar device according to embodiment 1 of the present disclosure.

Embodiments of the present disclosure will be described on the basis of FIGS. 1 to 18. Hereinafter, for convenience of the description, configurations having the same functions as the configurations described in a specific embodiment may be denoted by the same reference numbers and descriptions thereof may be omitted.

Embodiment 1

(Optical Radar Device)

A configuration of as optical radar device 100 according to embodiment 1 of the present disclosure will be described on the basis of FIGS. 1 and 2. The optical radar device 100 has a pulsed light irradiation/detection unit 10, a control/power source unit 20, a casing 30, and a drive/interface unit 40. The optical radar device 100 radiates pulsed light 1 toward a target object 3, receives reflected light from the target object 3, and measures the time-of-flight ToF.

The pulsed light irradiation/detection unit 10 irradiates the target object 3 with the pulsed light 1, and receives reflected light 2 from the target object 3.

The control/power source unit 20 supplies a power source to the pulsed light irradiation/detection unit 10, and controls the timings of the irradiation and detection of pulsed light.

The casing 30 holds the pulsed light irradiation/detection unit 10 and the control/power source unit 20.

The drive/interface unit 40 rotates the casing 30, and also supplies a power source to the control/power source unit 20 and transmits synchronization signals relating to rotation. The drive/interface unit 40 is also an interface that outputs measurement results from the control/power source unit 20 to an external device that is not depicted.

FIG. 1 depicts a coordinate axis. In a general application, the Z axis indicates a vertical direction, the Y axis indicates the irradiation direction of pulsed light, in other words, the target measurement direction, and the X-Y plane indicates a horizontal plane. The optical radar device 100 depicted in FIG. 1 rotates the pulsed light irradiation/detection unit 10 and thereby scans the pulsed light 1 in horizontal directions. The pulsed light irradiation/detection unit 10 may rotate 360 degrees or may rotate by a fixed range such as 120 degrees or 210 degrees.

(Pulsed Light Irradiation/Detection Unit)

Figure 2:
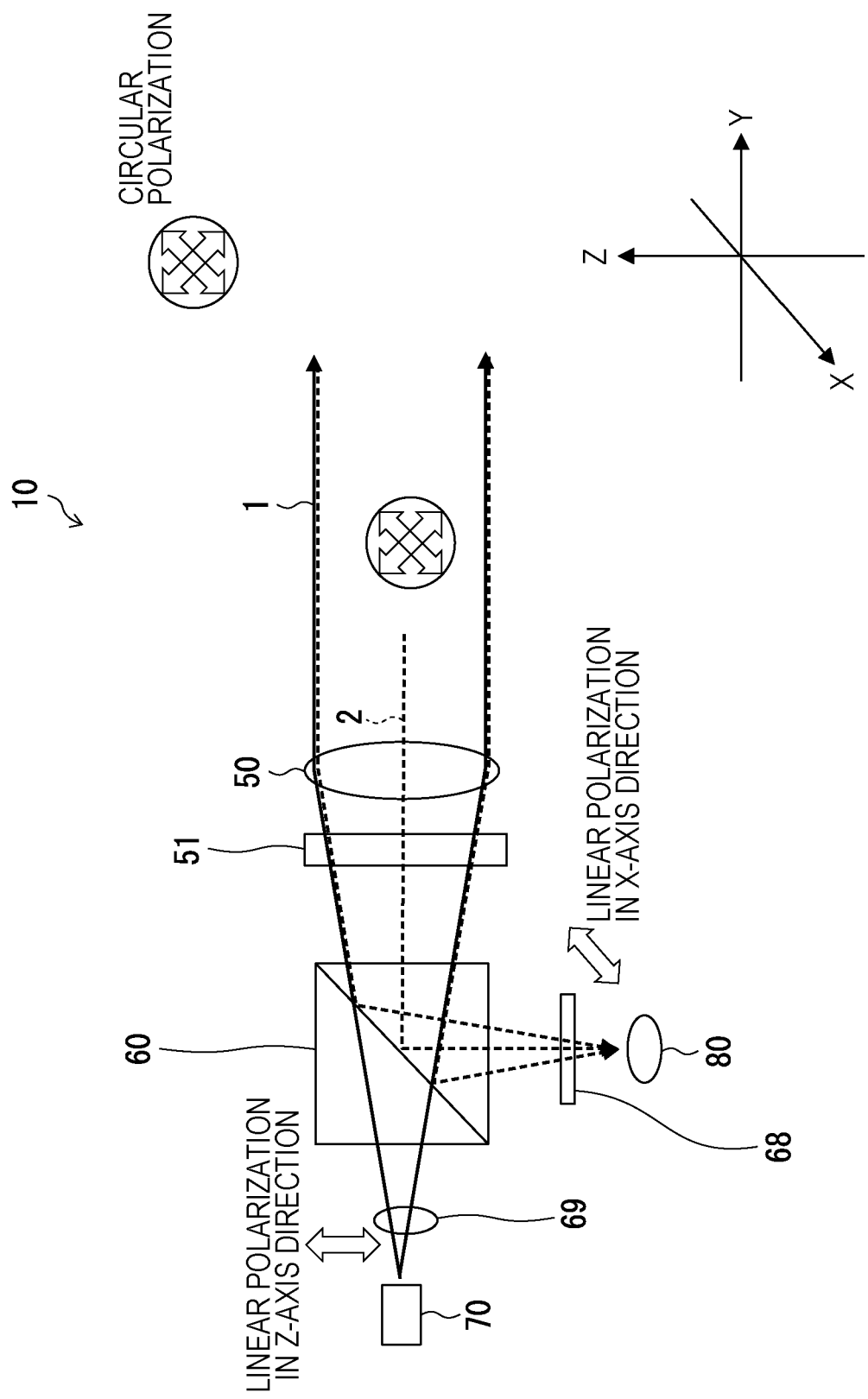
FIG. 2 is a schematic drawing depicting a configuration of a pulsed light irradiation/detection unit forming part of the optical radar device according to embodiment 1 of the present disclosure.

FIG. 2 is a schematic drawing of the pulsed light irradiation/detection unit 10. As depicted in FIG. 2, the pulsed light irradiation/detection unit 10 includes a lens 50, a quarter-wave plate 51, a polarizing beam splitter 60, a pulsed light emitting element 70, a shaping lens 69, a light receiving element 80, and an optical bandpass 68.

The lens 50 functions as an imaging optical element.

A light emitting part of the pulsed light emitting element 70 and a light detection part of the light receiving element 80 are arranged in one focal position of the lens 50. In other words, the light emitting part of the pulsed light emitting element 70 and the light detection part of the light receiving element 80 are arranged on one focal plane of the lens 50. With respect to the pulsed light 1, the lens 50 functions as a collimator lens. Furthermore, with respect to reflected light 2 from a long distance away, the lens 50 functions as an imaging lens that concentrates the reflected light 2 toward the light receiving element 80.

The pulsed light emitting element 70 is an element that emits pulsed light that is linearly polarized in the Z-axis direction, which is a first polarization direction.

The polarizing beam splitter 60 is a cube-type that has an interface at a plane that is inclined by 45 degrees with respect to the Z axis and parallel with the X axis, and transmits light that is emitted by the pulsed light emitting element 70 and is linearly polarized in the Z-axis direction.

The quarter-wave plate 51 circularly polarizes the pulsed light 1 that is linearly polarized in the Z-axis direction. Consequently, the pulsed light is radiated from the lens 50 toward the target object 3 as substantially parallel light that has been circularly polarized. The reflected light 2 from the target object 3 is concentrated by the lens 50, and a component that is linearly polarized in the X-axis direction, which is a second polarization direction, is concentrated toward the light receiving element 80 by the polarizing beam splitter 60. In a case where the reflected light 2 is circularly polarized light, the reflected light 2 is changed into X-axis direction linearly polarized light by the quarter-wave plate 51, and therefore there is little reflection loss in the polarizing beam splitter 60.

The pulsed light irradiation/detection unit 10 may be provided with a hood-shaped transparent cover (not depicted), for example, for suppressing the adhesion of obstructions such as raindrops, mud, and dirt, at the outer side of the lens 50. The cover may have a filter function for cutting light such as visible light that does not contribute to distance measurement. Other than this kind of hood which is a window for protecting the lens 50 which is an imaging optical element, it is preferable for the cover not to include other optical elements such as a reflective mirror. It is thereby possible to suppress a decline in the amount of light produced by reflection and changes in the polarization state. Configurations using a mirror for scanning are given in embodiments 2 and 3 described hereinafter, but these are components for performing scanning without using a rotation mechanism and are exceptions. Furthermore, a decline in the amount of light can be suppressed to be a minimum by using a highly precise mirror having high reflectance as a mirror for scanning.

In a case where an edge emitting laser chip is used as the pulsed light emitting element 70, the light emitting layer is parallel with the Z axis and the light emission optical axis is set to the Y-axis direction. An edge emitting laser chip performs linear polarization parallel to the light emitting layer, and is therefore able to cause linear polarization in the Z-axis direction due to this kind of setting. In the light emitted from an edge emitting laser chip, in the near field, the divergence in the direction perpendicular to the light emitting layer (X-axis direction) is greater than the divergence in the parallel direction (Z-axis direction), and therefore, in that state, the beam diameter of the pulsed light 1 in the X-axis direction becomes greater than the diameter in the Z-axis direction at the stage of being emitted from the lens 50. Thus, the pulsed light emitting element 70 may have the shaping lens 69. The shaping lens 69 may be provided and shaping may be performed such as bringing the beam shape of the pulsed light 1 when emitted close to a desired shape like circular shape. A rod lens or the like can be used as the shaping lens 69, for example. The shaping lens 69 forms the cross-section shape of the pulsed light 1 into a circular shape, and it is therefore possible to increase the light irradiation intensity on a comparatively near target object 3 by means of the shaping lens 69. However, this effect decreases over a lone distance where the light irradiation intensity should be increased, and therefore the sharing lens 69 is not an essential configuration.

In a case where a surface emitting laser chip (VCSEL: Vertical Cavity Surface Emitting Laser) is used as the pulsed light emitting element 70, similarly, it is sufficient for a linearly polarized surface emitting laser chip to be installed in such a way that the polarization direction is parallel to the Z axis. In this case, the divergence is approximately equal in all directions, and therefore the shaping lens 69 is not required.

It is preferable for the optical bandpass filter 68 to be provided in front of the light receiving element 80. In other words, the pulsed light irradiation/detection unit 10 has the optical bandpass filter 68 between the polarizing beam splitter 60 and the light receiving element 80. The optical bandpass filter 68 has a wavelength transmission bandwidth of several nm to several ten nm, with the wavelength of the pulsed light 1 as the central wavelength of the transmission band. By providing the optical bandpass filter 68, it is possible to reduce background light that is different from the pulsed light 1 and to improve the SN ratio.

According to the configuration of FIG. 2, due to the lens 50 being shared for both the irradiation and detection of light and the polarizing beam splitter 60 being employed, a configuration can be implemented in such a way that the pulsed light 1 and the reflected light 2 are transmitted on the same optical path. As a result, blind spots are not generated. Consequently, the divergence of the pulsed light 1 can be minimized and the pulsed light intensity on the target object 3 can be increased. Furthermore, there is no need for an optical element for guiding the reflected light 2 from a very close target object 3 to the light receiving element. Moreover, regarding light irradiation, linearly polarized light emitted by the pulsed light emitting element 70 can be radiated more or less without being altered, and therefore there is little light loss. Regarding the reflected light also, there is little loss in a case where the reflected light 2 from the target object 3 is circularly polarized light that is the same as the pulsed light 1. In addition, due to the lens 50 being shared, the number of large lenses in the system can be reduced and costs can be reduced. Furthermore, the polarizing beam splitter 60 is installed to the rear of the lens 50, in other words, in the opposite direction to the target object 3, and therefore the size of the polarizing beam splitter 60 can be reduced compared with the diameter of the lens 50. It is thereby possible to reduce costs.

(Pulsed Light Emitting Element)

The pulsed light emitting element 70 emits near-infrared pulsed light. The pulsed light emitting element 70 is an element that emits light at a pulse width in which the half-value width is approximately 1 nsec to several hundred nsec. The peak power of a pulse is several W to several hundred W. The light emission wavelength can be decided according to use, and is preferably infrared of approximately 700 nm to 1600 nm. This wavelength is not visible to the human eye and is therefore not disturbing. Moreover, as wavelength becomes longer, it becomes safer for both human eye and animal eye. In addition, the background light also decreases as the wavelength increases. It is particularly preferable for the wavelength to be in the vicinity of 940 nm to 950 nm because the intensity decreases due to the absorption of sunlight by moisture in the air. And also, the wavelength less than 1000 nm is beneficial because a low cost silicon element can be used for the light detection part. With a silicon element, quantum efficiency improves as the wavelength decreases, and therefore a wavelength in the vicinity of 900 nm to 950 nm is most preferable considering the aforementioned reasons.

The cross-section shape over a long distance of the pulsed light 1 is determined by the shape of a light emitting part, where laser light is actually emitted; therefore, in an edge emitting laser chip, the cross-section shape has an elliptical shape that is long in the direction parallel with the light emitting layer, short in the perpendicular direction. In the case of using the surface emitting laser chip, the cross-section shape is determined by the arrangement pattern of its constituent laser emitting units, and is often a circular shape, a regular polygon shape, or the like.

The divergence of the pulsed light 1 should be reduced as much as possible to maximize the light intensity on the target objects 3 far away from the optical radar device 100. Since the divergence of the pulsed light 1 increases as the size of the light emitting part of the pulsed light emitting element 70 increases, it is preferable for the light emitting part to be small. The size of the light emitting part here refers to the maximum diameter P of the light emitting part seen in the near field. In the edge emitting laser chip, the light emitting part is long in the direction parallel to the light emitting layer and is short in the perpendicular direction, and P is the length in the direction parallel to the light emitting layer and U is the length in the direction perpendicular to the light emitting layer. Ordinarily, P is approximately equal to a ridge width. The aspect ratio P/U of the light emitting part is P/U>>1. (Usually P/U is more than ten.) In the surface emitting laser chip, the light emitting part often includes a plurality of laser emitting units, and therefore the maximum diameter of the region where its laser emitting units are placed is the size P of the light emitting part rather than aperture size of the laser emitting unit. In the surface emitting laser chip, ordinarily, P/U~1.

It is preferable for the pulsed light emitting element 70 to include a laser chip that emits light and also a driving circuit that drives the laser chip. The control/power source unit 20 supplies a power source for the pulsed light emitting element 70 to emit light, and controls the timings of a charging operation prior to the emission of light and the light emission operation.

(Lens)

It is preferable for the lens 50 to have a long focal length f in order to maximize measurement range. If the focal length f is large, the divergence of the pulsed light 1 can be reduced, and the light irradiation intensity on distant objects 3 can be increased. In addition, the diameter of the pulsed light 1 increases, especially near the optical radar device 100, and therefore the light intensity that eye pupil is irradiated decreases and therefore requirement of Class 1 can be satisfied easily. Consequently, by setting the peak power of the pulsed light to be high, it becomes possible to measure much longer distances. Furthermore, it is preferable for an optical aperture D of the lens 50 to be large. The lens 50 with larger has more light concentrate capability, and can gather reflected light 2 from a distant object effectively. Note that only the quarter-wave plate 51 is provided between the lens 50 and the polarizing beam splitter 60 in FIG. 2, and therefore the Y-axis direction length of the pulsed light irradiation/detection unit 10 is as long as the focal length f. A mirror can be provided between the lens 50 and the polarizing beam splitter 60 to bend the optical path, and Y-axis direction length of the pulsed irradiation/detection unit 10 can be shortened.

In the present embodiment, the lens 50 is used as a collimator lens for irradiation light, and also concentrates the reflected light 2 onto the light receiving element as a light concentrating lens. Following three equations can be established approximately, where θ is FWHM (Full Width at Half Maximum) of the angular distribution of the emitted light, and Q is the size of the light detection part of the light receiving element 80. Here, trio light detection part is light sensitive area of the light receiving element 80, which detects photons. And Q should be the length of the light detection part in the corresponding direction as the size P of the light emitting part.

Diameter of the pulsed light 1 in the vicinity of the lens 50:

$$\phi 0 = 2 \cdot f \cdot \sin(\theta/2) (=1.3 \text{ cm})$$

Diameter of the pulsed light 1 at a remote distance L from the lens 50:

$$\phi(L) = P \cdot L/f + \phi 0 (=28.0 \text{ cm})$$

Diameter of a region (light detection region) on the target object 3 at the distance L, projected on the light detection part through the lens 50:

$$S(L) = Q \cdot L/f (=26.7 \text{ cm})$$

The numerical values in parentheses are values for the case where θ=10 degrees, f=75 mm, P=0.2 mm, Q=0.2 mm, and L=100 in. It is impossible to make the diameter of the pulsed light 1 smaller than φ(L). In order to increase the signal strength of the reflected light 2, it is desirable for the light detection region to be irradiated with the pulsed light 1 as much as possible. For distant objects whose L is much larger (10 times, for example) than. (φ·0f/P), φ0 can be more or less ignored, and therefore φ(L)≥S(L) is established when P≥Q. Consequently, if the optical axes of the light receiving system and the irradiation system are aligned, the entire light detection region is irradiated with the pulsed light 1, and a sufficient signal strength can be expected. Furthermore, if P>Q, in other words, if φ(L)>S(L), it is possible to have a margin for misalignment between the optical axes of the light receiving system and the irradiation system. Conversely, if Q is increased to the extent that S(L)>φ(L), light from the target objects 3 that are not irradiated with the pulsed light 1 is also concentrated on the light detection part, unnecessary background light is received, and the SN ratio decreases. Furthermore, the light receiving element 80 becomes larger, which causes an increase in costs.

On the other hand, with a short distance of approximately 1 m, in the aforementioned example, φ(1 m)~φ0=13 mm, S(1 m)=2.7 mm, φ(L)>>S(L), and the entire light detection region is irradiated with the pulsed light 1. However, in a case where the light receiving system and the irradiation system have separate lenses and the optical axes of both systems are parallel and separated by a distance M (20 mm, for example), the reflected light 2 from a target object 3 at a distance L (1 m, for example) is projected on the light detection part at a point that is a distance of $(M-\phi 0/2)/L \cdot f$ (=1.0 mm) from the center of the light detection part. This is far greater than the size of Q assumed, even if considering extension of image area due to defocusing. In order to receive this kind of reflected light, an optical element such as a reflective mirror or a lens should be placed near the light receiving element to guide the reflected light 2 on to the light detection part. If such an optical element is not used, relation of $M-\phi 0/2 << Q/2 \cdot L/f$ should be maintained.

As mentioned above, in the present configuration, where a lens is shared by the light receiving system and the irradiation system, the entire light detection region can be irradiated efficiently with the pulsed light 1 regardless of the distance to the target object 3. In particular, it is preferable that the size Q of the light detection part of the light receiving element 80 is approximately equal to or smaller than the size P of the light emitting part of the pulsed light emitting element 70. Generally, the light detection part is clearly divided by apertures or the like on the light receiving element 80, and therefore Q can be easily specified. However, there are cases where the light emitting part does not have sharp boundaries, and therefore it is not obvious regarding boundary of light emission intensity to define the light emitting part. For example, in a case where P is the FWHM (Full Width at Half Maximum) of the intensity distribution, which may sometimes be used to indicate the size of the light emitting part, the pulsed light 1 is present also in outside regions not included in P. Ordinarily, emitted light is present in a region that is 2.6 times the FWHM, and is comparatively strong in a region that is approximately 1.7 times the FWHM. Therefore, the size Q of the light detection part and the size P of the light emitting part are expressed as being "approximately" equal. Consequently, in a case where the so-called FWHM is used to express the size of the light emitting part, "approximately equal" means at least P can be 1.7 times of Q or less.

(Polarizing Beam Splitter)

The polarizing beam splitter 60, in FIG. 2, is described as a cube type for which two right-angle prisms are adhered together and a multilayer dielectric film is formed on the joining surfaces; however, not restricted to a cube type, any types of polarizing beam splitter, like a plate type, may be adopted. An ordinary polarizing beam splitter may be used which P-polarized incident light (light-polarized in the Z-axis direction in FIG. 2) passes through the joining surfaces and S-polarized light (light polarized in the X-axis direction in FIG. 2) is reflected. It is preferable for the polarizing beam splitter 60 to be installed separated from the lens 50 as much as possible. Thus, as is clear from FIG. 2, the size of the polarizing beam splitter 60 can be reduced as the distance from the lens 50 increases.

(Light Receiving Element)

In the light receiving element 80, it is preferable that the shape of the light detection part is similar to the cross-section shape of the pulsed light 1 on a distant object 3.

For example, in the case of the edge emitting laser having the cross-section shape that is an elliptical shape, it is preferable for the shape of the light detection part to be an elliptical shape or a rectangular shape that covers the elliptical shape. It is preferable for the aspect ratio Q/V of light detection part to match the aspect ratio P/U of the light emitting part, where Q is the long-axis length of the ellipse of the light detection part, or the length of a long side of the rectangle, and V is the short-axis length of the ellipse, or the length of a short side of the rectangle. In the case of the surface emitting laser having a cross-section shape that is more or less a circular shape, it is preferable that the light detection part has a circular shape or a square shape that covers the circular shape. Thus, the pulsed light irradiation region on a distant target object 3 can cover the light detection region effectively, and therefore the intensity ratio of the pulsed light 1 with respect to background light can be increased, and it becomes possible to measure up to even longer distances. Note that the aforementioned light detection part refers to a portion where photoelectric conversion is actually possible, and does not include a dummy pattern or the like, arranged in the periphery of an actual light detection part.

The light detection part of light receiving element 80 is composed of a photoelectric conversion element such as an avalanche photodiode, for example. The light detection part may be configured of one photoelectric conversion element, or may have a plurality of photoelectric conversion elements arranged in a parallel manner. As mentioned above, it is preferable for the size Q of the light detection part to be less than or equal to the size P of the light emitting part of the pulsed light emitting element 70. Even if Q is made to be larger than P, this only results in an increase in the detection of light from the surface of target objects 3 that are not irradiated with the pulsed light 1 and an increase in background light signals, and the maximum measurement distance does not increase.

The material constituting the light detection part of the light receiving element 80 may be a group IV semiconductor such as silicon or germanium, or may be a compound semiconductor such as GaAs or InGaAs. The output of the light receiving element 80 may be current itself similar to an avalanche photodiode, or may be a pulse signal obtained by photon counting similar to a SPAD. As mentioned above, it is preferable that Q is approximately equal to or less than P, and the quantum efficiency of the photoelectric conversion element is as high as possible.

The light receiving element 80 supplies a power source to the light detection part at a prescribed timing and starts light detection, adds processing such as amplification to a signal that is output by the light detection part, and outputs detected light Signal as a function of time. The light receiving element 80 may have a function for deciding the time-of-flight ToF from the light detection signal. The supply of a power source to the light receiving element 80 and the timing control are performed by the control/power source unit 20. For the receiving of light to be started after the emission of pulsed light, a timing signal may be sent directly from the pulsed light emitting element 70.

(Control/Power Source Unit and Drive/Interface Unit)

Any disclosed technology can be applied for the control/power source unit 20 and the drive/interface unit 40, and therefore these will not be described in detail. The drive/interface unit 40 rotates the casing 30 to a prescribed angle, and, in synchronization therewith, the control/power source unit 20 causes the pulsed light emitting element 70 to emit pulsed light, and the target object 3 is irradiated with the pulsed light 1. At the same time as the emission of pulsed light, the light receiving element 80 starts to measure the reflected light 2. Signal rise from a background level is detected and round trip time of light is determined. Namely the time-of-fight ToF, is measured. With this time T, the distance L to the target object 3 is calculated according to $L=c \cdot T/2$ (c~3E8 m/sec: light speed). This result is sent outside together with information regarding the rotation angle, from the drive/interface unit 40, via the control/power source unit 20.

(Description of Effect)

According to the present embodiment, it is easy for the light detection region to be completely covered by the irradiation region of the pulsed light 1 from the vicinity of the lens 50 to very distant place, and the conditions to be satisfied therefor have been described. Furthermore, it has been described that, in a case where the optical axes of the irradiation system and the light receiving system do not overlap, some kind of optical element is necessary in order to measure the distance to a target object 3 in the vicinity of the lens 50. Hereinafter, measurement limitations over a lone distance will be described.

In the present embodiment, the optical axes of the irradiation system and the light receiving system overlap, and therefore the divergence of the pulsed light 1 can be kept to a minimum. In a case where the collimator lens of the irradiation system and the light concentrating lens of the light receiving system are arranged in parallel and separated by a distance M (the distance between the centers of the lenses, 2 cm for example), and the optical axes of the irradiation system and the light receiving system are parallel, the radius of the irradiation region has to be M+S(L)/2, and consequently the diameter has to be $\phi d(L)=2 \cdot M+S(L)$. Otherwise, the irradiation region and the light detection region do not overlap completely. In a case of the example used to explain the lens 50 ($\theta$=10 degrees, f=75 mm, P=0.2 mm, c=0.2 mm, and L=100 m), d(100 m) 30.7 cm for M=2 cm, which is an increase of approximately. 10% from $\phi(100$ m)=28.0 cm according to the present configuration, and a decrease in the light irradiation intensity is approximately 20%. Furthermore, the maximum measurement distance decreases by approximately several percent to 10%.

However, a more serious problem occurs with shorter distances. In a case where L=30 m, for example, $\phi d(30$ m)=12.0 cm, which is 1.3 times greater than $\phi(30$ m)=9.3 cm. Consequently, to illuminate entire surface of the light detection region on the target object 3, the divergence of the pulsed light 1 has to be increased. In this example, the divergence of the pulsed light 1 should be about 0.20 degrees, which is approximately 1.36 times greater than the 0.15 degrees of the present configuration. This means that, the light irradiation intensity on a distant target object 3 decreases to approximately 0.54 times of the present configuration to fully irradiate the light detection region on a medium range (~30 m) object. Consequently, the light irradiation intensity at a long distance greatly decreases, which indicates that the maximum measurement distance inevitably shortens by approximately 30% to 40%. The optical axes of the irradiation system and the light receiving system can also be set to cross at a medium distance to achieve complete overlap of the irradiation region and the light detection region. However, such configuration separates the two regions more than the previous parallel case, and therefore the divergence of the pulsed light 1 inevitably increases. Consequently, the light irradiation intensity on the distant target object 3 ultimately decreases, and the maximum measurement distance greatly decreases.

Embodiment 2

Figure 3:
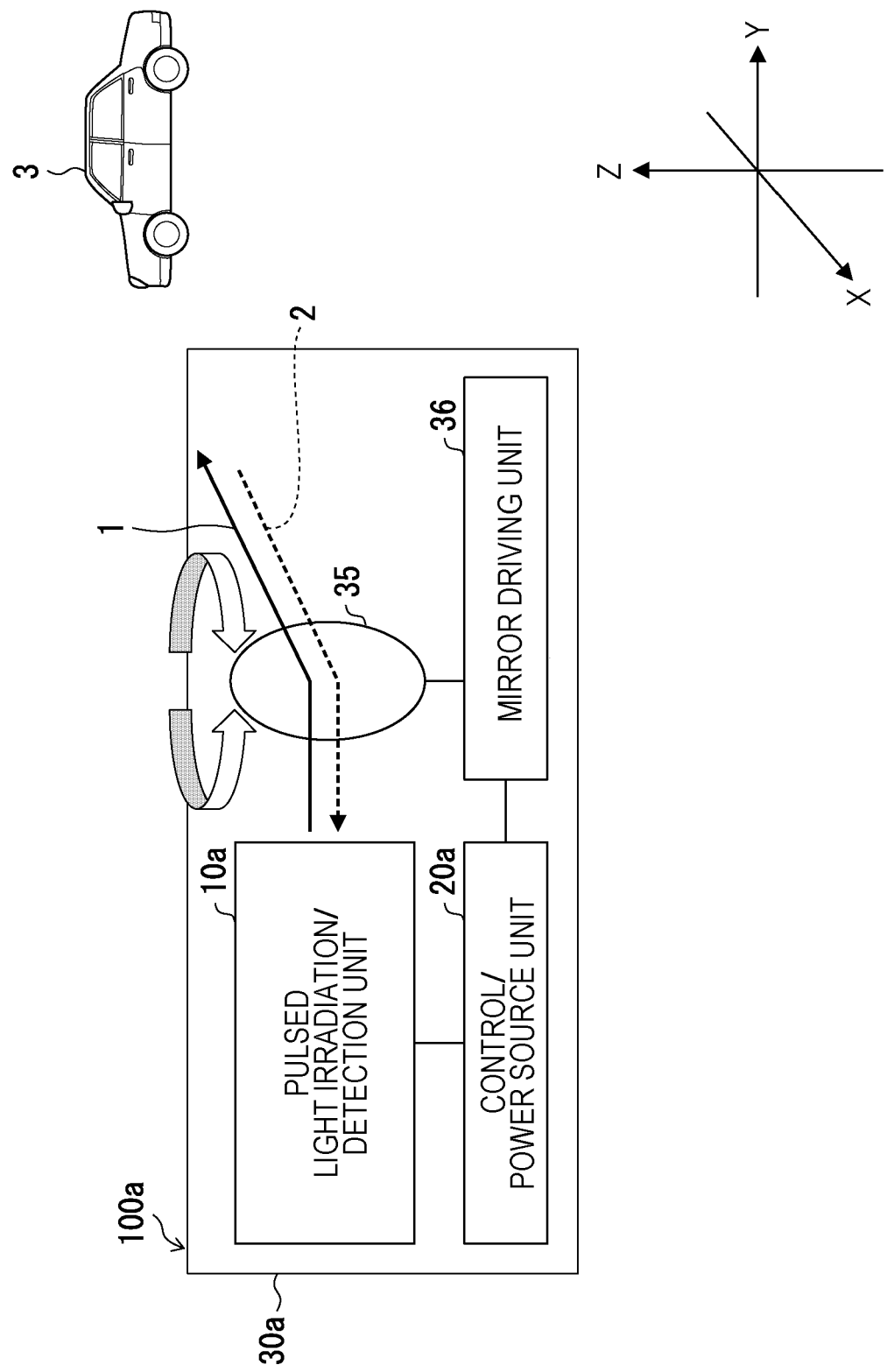
FIG. 3 is a schematic drawing depicting an optical radar device according to embodiment 2 of the present disclosure.

FIG. 3 depicts an optical radar device 100a according to embodiment 2. The optical radar device 100a is different from the optical radar device 100 in that a measurement region is scanned by means of a reflective mirror rather than a rotation mechanism. A pulsed light irradiation/detection unit 10a has the same function as the pulsed light irradiation/detection unit 10. It is not necessary to rotate a casing 30a, and therefore it is easy to reduce size and weight and to reduce power consumption. In addition, there is a benefit in that the reflective mirror can perform two-dimensional scanning. To achieve two-dimensional scanning, it is also possible to adopt tow mirrors, each of which scans one direction. Therefore number of mirrors is note restricted to one as shown in FIG. 3.

The optical radar device 100a has the pulsed light irradiation/detection unit 10a, a control/power source unit 20a, a mirror 35, a mirror driving unit 36, and the casing 30a.

The pulsed light irradiation/detection unit 10a irradiates the target object 3 with the pulsed light 1, and receives the reflected light 2 from the target object 3.

The control/power source unit 20a supplies a power source to the pulsed light irradiation/detection unit 10a, and controls the timings of the irradiation and detection of pulsed light.

The mirror 35 reflects the pulsed light 1 to the irradiation direction.

The mirror driving unit 36 controls the direction in which the mirror 35 faces.

The control/power source unit 20a decides the direction in which the mirror 35 faces, and outputs instructions for controlling the mirror 35 to the mirror driving unit 36.

Furthermore, the control/power source unit 20a also functions as an interface that outputs measurement results outside.

The casing 30a houses the pulsed light irradiation/detection unit 10a, the control/power source unit 20a, the mirror 35, and the mirror driving unit 36. The casing 30a has a window through which the pulsed light 1 and the reflected light 2 pass. The window may have a hood-shaped transparent cover in order to suppress the adhesion of obstructions such as raindrops, mud, and dirt. Furthermore, the cover may have a filter function that cuts light that does not contribute to distance measurement such as visible light.

The reflected light 2 is reflected by the mirror 35 and reaches the pulsed light irradiation/detection unit 10a.

In a case where the mirror 35 rotates with the axis as the rotation axis, one-dimensional scanning is performed within the X-Y plane, similar to embodiment 1. The mirror 35, in addition to rotating about the Z axis, rotates about an axis that is orthogonal to the Z axis and intersects the X axis at 45 degrees, and can thereby perform scanning in the Z-axis direction. The positional relationship between the pulsed light irradiation/detection unit 10a and the mirror 35 in the optical radar device 100a is not restricted to the positional relationship depicted in FIG. 3, and can be decided in accordance with use. For example, by aligning the pulsed light irradiation/detection unit 10a in the Z-axis direction, and controlling the mirror 35 in terms of rotation about the Z axis and inclination with respect to the Z axis, 360 degrees can be covered Within the X-Y plane and a prescribed angle can be achieved in the Z-axis direction, and a region having a wide range can be measured. The mirror 35 may be a galvanometer mirror or may be a MEMS mirror.

The optical radar device 100a according to the present embodiment is provided with the polarizing beam splitter 60, and therefore the lens 50 can be shared between the irradiation system and the light receiving system. Furthermore, in the optical radar device 100a, the optical axes of the irradiation system and the light receiving system overlap, and it is therefore possible to suppress the occurrence of blind spots and also to keep the divergence of the pulsed light 1 to a minimum and extend the maximum measurement distance. Furthermore, the optical radar device 100a can perform two-dimensional scanning, and a reduction in size is easy.

Embodiment 3

Figure 4:
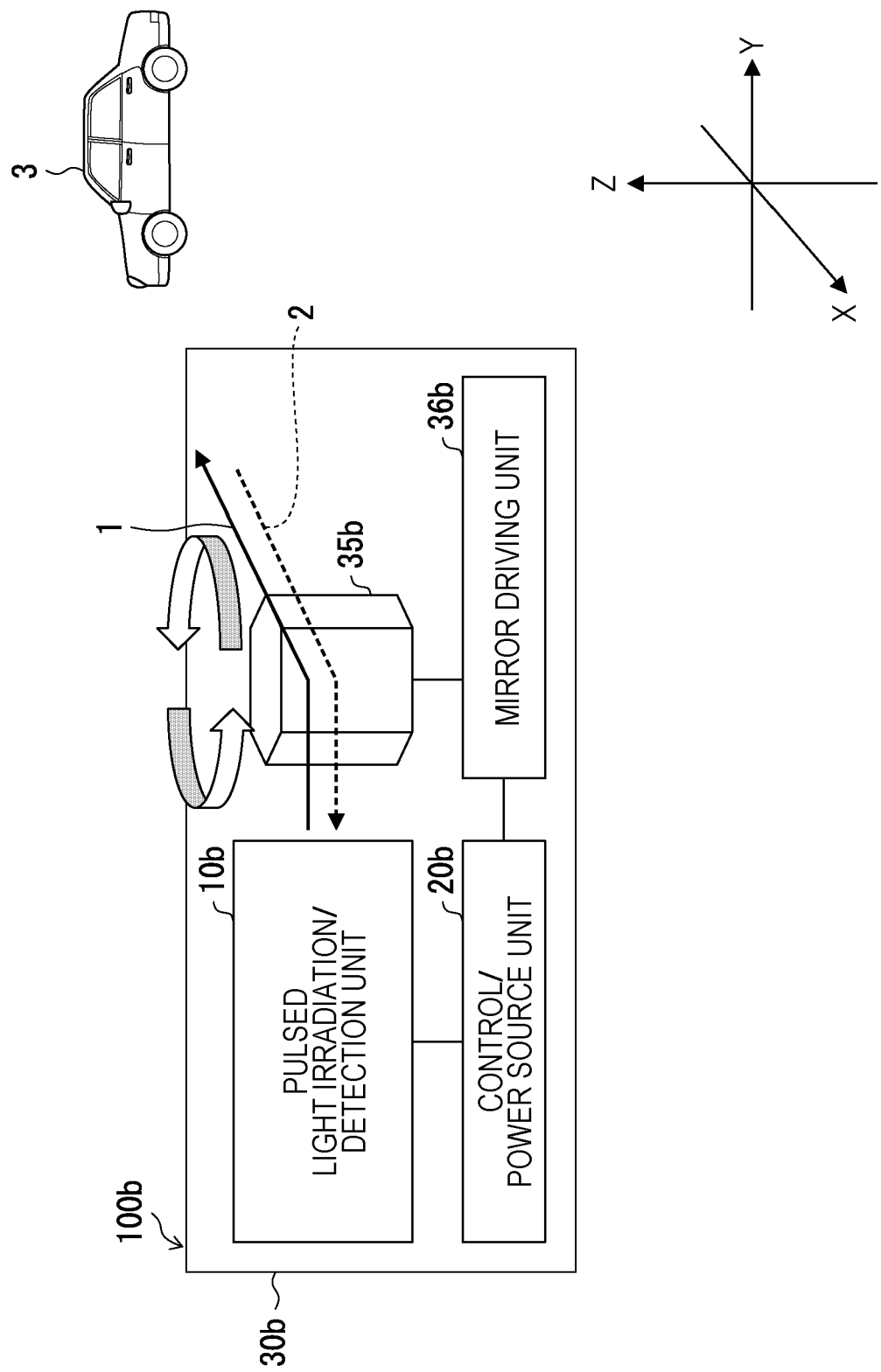
FIG. 4 is a schematic drawing depicting an optical radar device according to embodiment 3 of the present disclosure.

FIG. 4 depicts an optical radar device 100b according to embodiment 3. The optical radar device 10)b is different from the optical radar device 100 in that a measurement region is scanned by means of a polygon mirror rather than a rotation mechanism. A pulsed light irradiation/detection unit 1)b has the same function as the pulsed light irradiation/detection unit 10. It is not necessary to rotate a casing 30b and therefore it is easy to reduce size and weight and to reduce power consumption. The polygon mirror has a benefit in that two-dimensional scanning can be performed.

The optical radar device 100b has the pulsed light irradiation/detection unit 10b control/power source unit 20b a polygon mirror 3b, a mirror driving unit 36b, and the casing 30b.

The pulsed light irradiation/detection unit 10b irradiates the target object 3 with the pulsed light 1, and receives the reflected light 2 from the target object 3.

The control/power source unit 2b supplies a power source to the pulsed light=irradiation detection unit 10b and controls the timings of the irradiation and detection of pulsed light.

The polygon mirror 35b reflects the pulsed light 1 to the irradiation direction.

The mirror driving unit 36h controls the rotation of the polygon mirror 35b.

The control/power source unit 20b decides the direction in which the polygon mirror 35b faces, and outputs instructions for controlling the polygon mirror 35b to the mirror driving unit 36b.

Furthermore, the control/power source unit 20b also functions as an interface that outputs measurement results outside.

The casing 30b houses the pulsed light irradiation/detection unit 10b the control/power source unit 20b the polygon mirror 35b, and the mirror driving unit 36b. The casing 30b has a window through which the pulsed light 1 and the reflected light 2 pass. The window may have a hood-shaped transparent cover in order to suppress the adhesion of obstructions such as raindrops, mud, and dirt. Furthermore, the cover may have a filter function that cuts light such as visible light that does not contribute to distance measurement.

The reflected light 2 is reflected by the polygon mirror 35b and reaches the pulsed light irradiation/detection unit 10b. In a case where the angle of inclination of a mirror surface of the polygon mirror 35b fixed and rotation is performed with the Z axis as the rotation axis, one-dimensional scanning is performed within the X-Y plane, similar to embodiment 1. If the angle of inclination of each mirror surface of the polygon mirror 35b with respect to the Z axis is set to a different angle, horizontal scanning can be performed at a plurality of different angles in the Z-axis direction. The positional relationship between the pulsed light irradiation/detection unit 1)b and the polygon mirror 35b in the optical radar device 10)b is not restricted to the positional relationship depicted in FIG. 4, and can be decided in accordance with use.

The optical radar device 100b according to the present embodiment is provided with the polarizing beam splitter 60, and therefore the lens 50 can be shared between the irradiation system and the light receiving system. Furthermore, in the optical radar device 100b the optical axes of both systems overlap, and it is therefore possible to suppress the occurrence of blind spots and also to keep the divergence of the pulsed light 1 to a minimum and extend the maximum measurement distance. Furthermore, the optical radar device 100b can perform two-dimensional scanning, and a reduction in size is easy.

Embodiment 4

Figure 5:
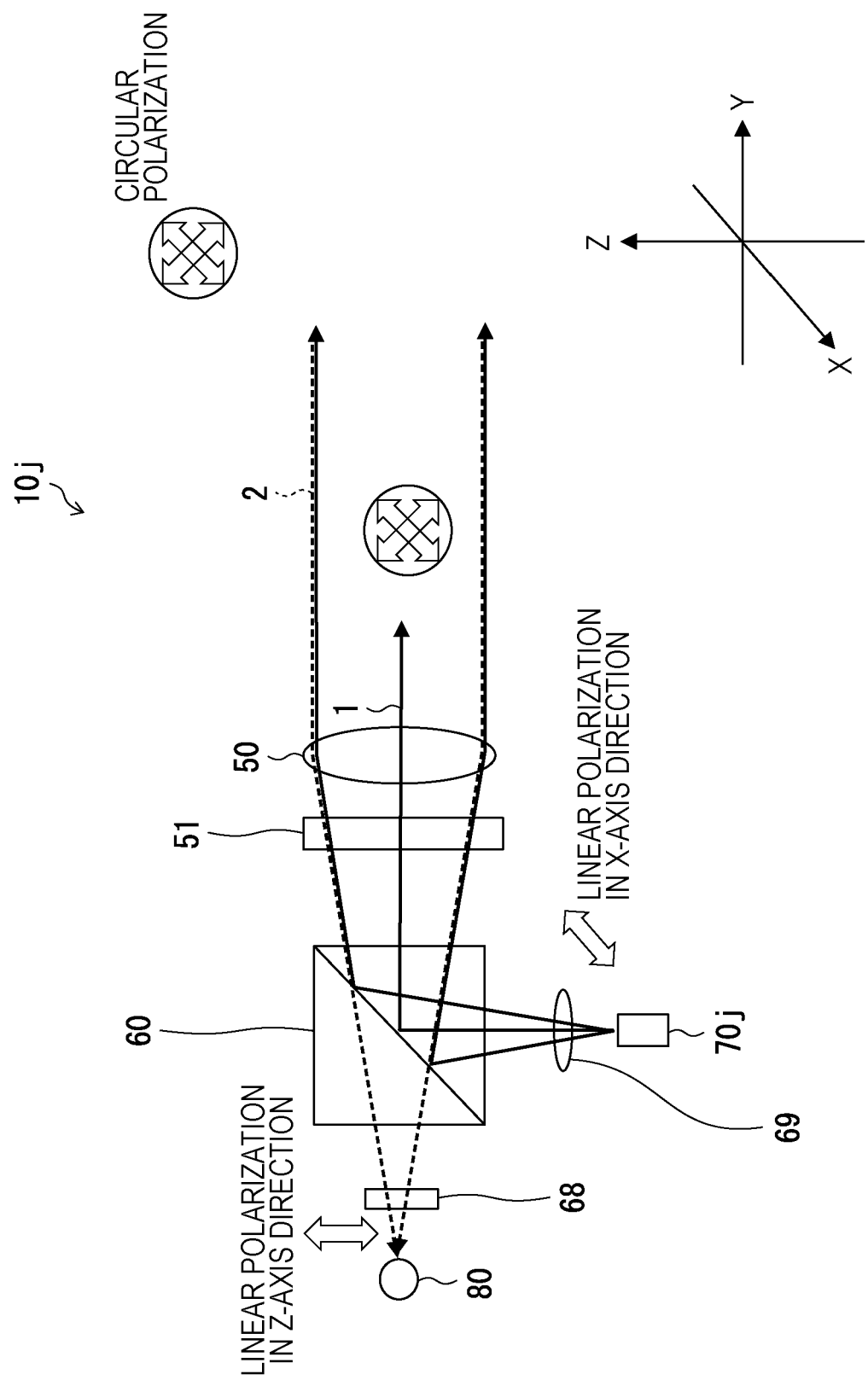
FIG. 5 is a schematic drawing depicting a pulsed light irradiation/detection unit according to embodiment 4 of the present disclosure.

FIG. 5 depicts an optical radar device 100j according to embodiment 4. A pulsed light irradiation/detection unit 10j of the optical radar device 100j is the same as the pulsed light irradiation/detection unit 10 except swapping positions of a pulsed light emitting element 70j and a light receiving element 80. The pulsed light emitting element 70j is arranged in such a way as to emit light that is linearly polarized in the X-axis direction. The light receiving element 80 receives light that is linearly polarized in the Z-axis direction. An effect similar to that of embodiment 1 is demonstrated also in the present embodiment.

Embodiment 5

FIG. 6 depicts an optical radar device 100k according to embodiment 5. In a pulsed light irradiation/detection unit 10k of the optical radar device 100k, the characteristics of a polarizing beam splitter 60k are different from the pulsed light irradiation/detection unit 10. In other words, light that is linearly polarized in the X-axis direction is transmitted, and light that is polarized parallel to the Z-axis direction is reflected. Consequently, the pulsed light emitting element 70k is arranged in such a way as to emit light that is linearly polarized in the X-axis direction. The light receiving element 80 receives light that is linearly polarized in the Z-axis direction. An effect similar to that of embodiment 1 is demonstrated also in the present embodiment.

Note that there is no restriction to the polarizing beam splitter 60k, and a polarizing beam splitter having different polarization characteristics may be used. Furthermore, the polarization direction is also not restricted. Regardless of any combinations, it is possible to suppress the occurrence of blind spots and also to extend the maximum measurement distance by minimizing the divergence of the pulsed light 1, on condition that the irradiation system and the light receiving system share one optical axes. The optimum configuration can be selected on the basis of factors such as the size, shape, and manufacturing cost of the optical radar device.

Embodiment 6

FIG. 7 depicts a pulsed light irradiation/detection unit 10c according to embodiment 6. The pulsed light irradiation/detection unit 10c according to the present embodiment is different from the aforementioned embodiments in that a pulsed light emitting element 70c includes a plurality of light emitting parts and a light receiving element 80c includes a plurality of light detection parts.

In the optical radar device 100 according to embodiment 1, the lens 50 is shared by the irradiation system and the light receiving system and the optical axes of both systems overlap, and it is therefore possible to suppress the occurrence of blind spots and also to keep divergence of the pulsed light 1 to a minimum and extend the maximum measurement distance. However, a single channel configuration is adopted, which is a disadvantage for increasing the resolution. Thus, in the present embodiment, a multi-channel configuration is adopted and the measurement points are increased to realize higher resolution lie re are similarities with the aforementioned embodiments in that the lens 50 is shared by the irradiation system and the light receiving system and the optical axes of both systems overlap, and in that the polarizing beam splitter 60, the quarter-wave plate 51, the optical bandpass filter and a shaping lens 69c are used therefor.

As an example of a multi-channel configuration, the light emitting parts of the pulsed light emitting element 70c and the light detection parts of the light receiving element 80c may be made to correspond one-to-one. In this case, it is desirable for the optical axis of each light emitting part to be aligned to the optical axis of the corresponding light detection part. Positional alignment accuracy needs micron-order precision to place the light emitting parts and the light detection parts. This precise positing causes serious problem in manufacturing process. The size of the optical radar device becomes smaller, the problem becomes more severe. Improving this point is an aim of the present embodiment.

FIGS. 8A and 8B are schematic drawings of the pulsed light emitting element 70c. FIG. 8A is a front view and FIG. 8B is a top view. FIGS. 8A and 8B illustrate an example case where there are eight light emitting parts 78-1 to 8; however, the number of light emitting parts is not restricted to eight and two or more and more than eight are also adoptable.

In the pulsed light emitting element 70c, the plurality of light emitting parts 78-1 to 8 are monolithically integrated.

As depicted in FIG. 8A, an N-layer 71 includes an N-type GaAs substrate and an N-type layer grown thereon. A light emitting layer 72 and a P-layer 73 are sequentially epitaxially grown on the N-layer 71. The light emitting layer 72 includes the light emitting parts 78-1 to 8. Ridges 77-1 to 8 and P-electrodes 76-1 to 8 are formed corresponding to each light emitting part 78-1 to 8. The ridges 77-1 to 8 are arranged in a mutually parallel manner at equal intervals R. An insulating film 74 is coated between the ridges 77-1 to 8. The light emitting parts 78-1 to 8 emit lights 1-1 to 1-8 which are linearly polarized in the Z-axis direction as the light emitting part 70 of embodiment 1 does.

As depicted in FIG. 8B, the center lines of the ridges 77-1 to 8 are orthogonal with an end surface 79F and an end surface 79B. Note that light is emitted from the end surface 79F in the direction of the arrow indicating the light irradiation direction. The pulsed light emitting element 70c is set, up in such a way that the end surface 79F is perpendicular and the ridges 77-1 to 8 are parallel with respect to the optical axis of the irradiation system.

The distance between the light emitting parts 78-m (m being any integer from 1 to 8) and the optical axis of lens 50 is taken as Zm. FIGS. 8A and 8B exemplify a case where the light emitting part 78-3 is on the optical axis of lens 50. In other words, $Zm=(m-3) \cdot R$. A pulsed light 1-m, which is emitted from the light emitting part 78-m, passes through the shaping lens 69c, the polarizing beam splitter 60, the quarter-wave plate 51, and the lens 50 and propagates to the target object 3; the light 1-m is radiated with different angles Am in the Z-axis direction from the optical axis of the lens 50 depending on Zm, where Am and Zm satisfy a relationship $\tan(Am)=Zm/f$. An N-electrode 75 is formed on the surface of the N-layer 71 that is opposite to the surface on which the light emitting layer 72 is formed. Each light emitting part 78-m generates light by a current being supplied between the corresponding P-electrode 76-m and the common N-electrode 75. Here, sequential light emission is assumed.

Although not depicted in FIGS. 8A and 8B, the pulsed light emitting element 70c can include a driving circuit for each light emitting part 78-m. The control/power source unit 20c supplies a power source for each light emitting part 78-m to emit light, and also controls the timings of a charging operation prior to the emission of light and the light emission operation.

FIG. 9 is a schematic drawing of the light receiving element 80c. Similar to the pulsed light emitting element 70c depicted in FIGS. 8A and 8B, FIG. 9 depicts eight light detection parts 81-1 to 81-8. The light detection parts 81-m are arranged with the same pitch R of the light emitting part. Each light detection part 81-m has a light detection control unit 82-m. The light detection control units 82-m supply a power source to the light detection parts 81-m, amplify and process output signals from the light detection parts 81-m, and transmit the output signals to a measurement circuit 83 that measures the time-of-flight. The measurement circuit 83 obtains a time-of-flight ToFm for each light detection part. 81-m, and sends the time-of-flight ToFm to a control/DO/power source unit 84.

The control/power source unit 20c supplies a power source to the light receiving element 80c and controls the light detection timing. The pulsed light emitting element 70c may send a timing signal for the receiving of light to be started after pulsed light is emitted, directly to the light receiving element 80.

As depicted in FIG. 9, the light receiving element 80c is set up perpendicular to the Z axis in such a way that a center line 85 of the light detection parts is parallel with the optical axis of the lens 50. Corresponding to the pulsed light emitting element 70c of FIGS. 8A and 8B, the optical axis of the lens 50 falls on the center of the light detection part 81-3. Coordinates Ym of the light detection parts 81-m can be represented by $Ym=(m-3) \cdot R$. Reflected light 2-m of the pulsed light 1-m from target object 3 is focused on the light detection part 81-m and one-to-one correspondence between light emitting part 78-m and the light detection part 81-m is established.

In a case where the pulsed light emitting element 70c and the light receiving element 80c are monolithically formed, the positional relationships between the light emitting parts 78-m and the light detection parts 81-m are determined by the photo-lithography technique of semiconductor industry, and therefore manufacturing can be performed with very high precision. In the present embodiment, it is not necessary to manipulate many small components such as individual light emitting parts and light detection parts to place them at designed location with high precision. It is sufficient to place the pulsed light emitting element 70c and the light receiving element 80c, which are far larger than the individual light emitting parts and light detection parts, and therefore it is extraordinarily easy to manufacture the pulsed light irraddation/detection unit 10c. The effect is more notable particularly in cases where the number of light emitting parts and light detection parts is increased to 16, 32, or 64 in order to increase resolution. Consequently, with the configuration according to the present embodiment, it is easy to manufacture the pulsed light irradiation/detection unit 10c, the occurrence of defects is suppressed, and production can be performed with low costs.

It is preferable that there is the same relationship described in embodiment 1 between the size of each individual light emitting part 78-m and the size of the corresponding light detection part 81-m. In other words, with respect to the size Pm of the light emitting parts 78-m and the size Qm of the light detection parts 81-m, it is preferable for Qm to be approximately equal to or smaller than Pm. Furthermore, it is more preferable for the aspect ratio (P/U)m of the light emitting parts 78-*m* and the aspect ratio (Q/V)m of the light detection parts 81-*m* to be approximately equal. Thus, the pulsed light irradiation region on a distant target object 3 can cover the light detection region in a non-wasteful manner, and therefore the intensity ratio of the pulsed light 1 with respect to background light can be increased, and it is possible to measure up to even longer distances.

Note that the single devices depicted in FIGS. 8A, 8B, and 9 as the pulsed light emitting element 70*c* and the light receiving element 80*c* may be arranged in plurality. For example, if two light emitting devices having the eight light emitting parts depicted in FIGS. 8A and 8B are arranged side-by-side in series, these can be used as pulsed light emitting elements having a total of 16 light emitting parts. Similarly, if two light receiving devices having the eight light detection parts depicted in FIG. 9 are arranged side-by-side in series, these can be used as light receiving elements having a total of 16 light detection parts. Although the workload doubles compared to the case where only one of each device is used, a pulsed light emitting element and a light receiving element having twice the resolution can be easily manufactured without developing devices having 16 light emitting parts and light detection parts. Furthermore, in order to make above mentioned 16 channel devise with an unique pitch R feasible, it is preferable that the distance between the centers of ridge 77-1 and side edge of 70*c* near 77-1 is equal to R/2 or less and 77-8 and its near side-edge satisfies the same relationship. The same relationship should be maintained for the detection parts 81-1 and 81-8 to their near side-edge of 80*c*.

In the optical radar device 100*c* according to the present embodiment, the lens 50 is shared by the irradiation system and the light receiving system and the optical axes of both systems overlap, and it is therefore possible to suppress the occurrence of blind spots and also to keep the divergence of the pulsed light 1-*m* to a minimum and extend the maximum measurement distance in addition, the optical radar device 100*c* according to the present embodiment has a plurality of light emitting parts and a plurality of light detection parts for improving angular resolution, and has the feature that the manufacturing method is particularly easy.

In the present embodiment, the arrangement pitches of the light emitting parts 78-*m* of the pulsed light emitting element 70*c* are uniform. Consequently, the arrangement pitches of the light detection parts 81-*m* of the light receiving element 80*c* are also uniform. However, it is not always necessary for the arrangement pitches to be uniform, and various alterations are possible. For example, for the purpose of increasing resolution in the central section of the field of view and decreasing resolution in the peripheral sections, the distance between adjacent light emitting parts can be made to be shorter in the central section of the pulsed light emitting element 70*c* compared to the peripheral sections. In doing so, the coordinates Zm of the light detection parts 81-*m* of the light receiving element 80*c* have to be equal to the coordinates Zm of the corresponding light emitting parts 78-*m*.

In the present embodiment, a case has been given in which the light emitting parts 78-*m* of the pulsed light emitting element 70*c* and the light detection parts 81-*m* of the light receiving element 80*c* correspond one-to-one; however, a configuration having a one-to-two correspondence or the like is also possible. For example, there may be light detection parts 81-*ma*, 81-*mb*, and 81-*mc* for one light emitting part 78-*m*, and the like to enhance angular resolution much higher.

Embodiment 7

An optical radar device 100*d* according to embodiment 7 is a configuration similar to the optical radar device 100*c* according to embodiment 6, with the difference being a light receiving element 80*d* that is provided in a pulsed light irradiation/detection unit 10*d*.

Figure 11:
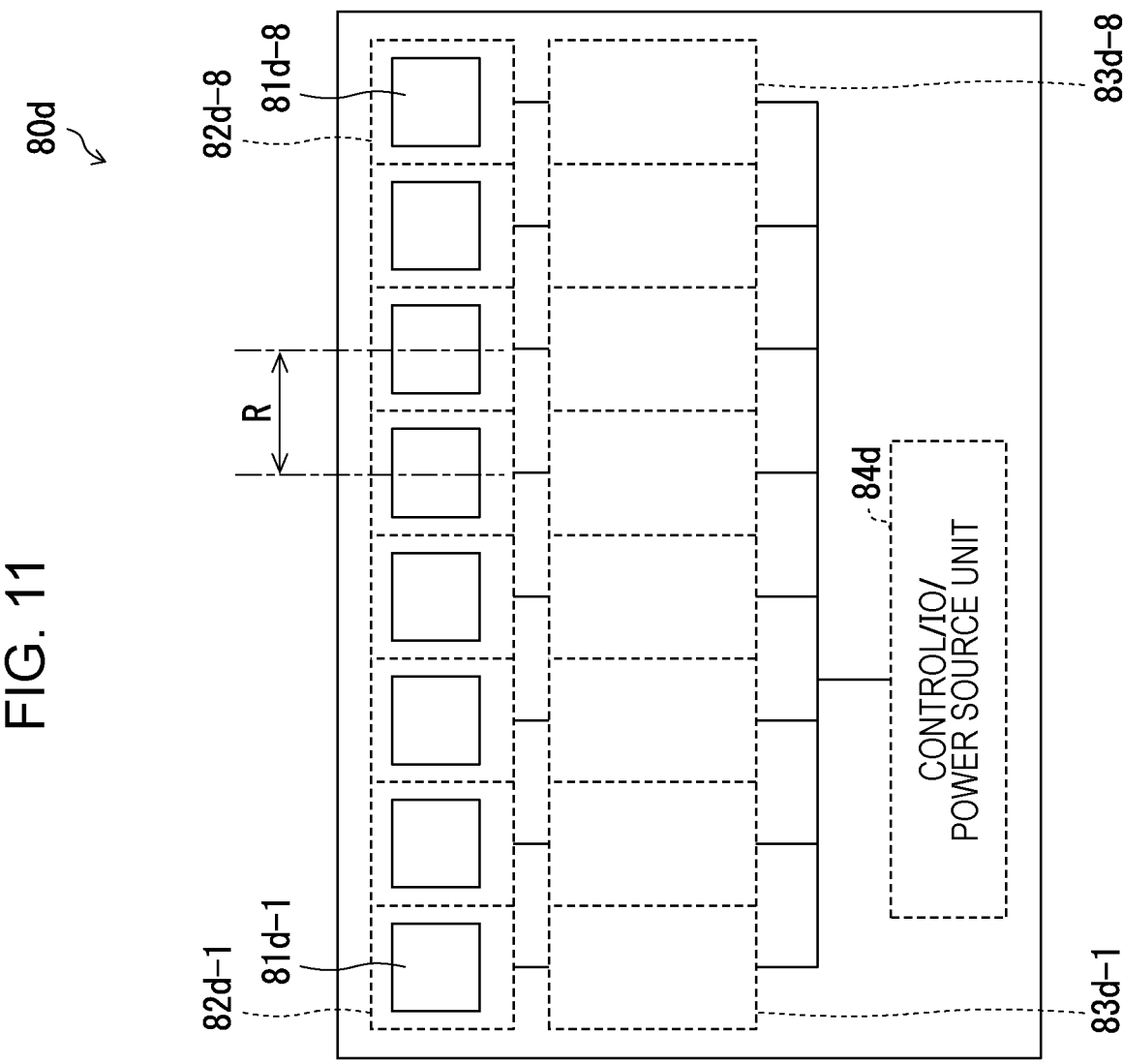
FIG. 11 is a schematic drawing depicting a light receiving element forming part of a pulsed light irradiation/detection unit according to embodiment 7 of the present disclosure.

FIG. 11 is a schematic drawing depicting a configuration of the light receiving element 80*d* according to the present embodiment. The light receiving element 80*d* has a plurality (eight in FIG. 11) of light detection parts 81*d*-1 to 8 and right detection control units 82*d*-1 to 8 just like the light receiving element 80*c*. The light receiving element 80*d* also has a plurality (eight in FIG. 11) of measurement circuits 83*d*-1 to 8 corresponding to the light detection parts 81*d*-1 to 8. The external appearance of the pulsed light emitting element according to the present embodiment is similar to that of the pulsed light emitting element 70*c* depicted in FIGS. 8A and 8B; however, in the present embodiment, a plurality (eight in the present embodiment) of light emitting parts can emit light at the same time. Furthermore, the light detection parts 81*d*-1 to 8 can receive light also at the same time. In embodiment 6, pairs of light emitting parts and light detection parts operated sequentially one pair at a time; however, in the present embodiment, pairs of light emitting parts and light detection parts can operate in parallel. It is thereby possible to shorten the measurement time. Furthermore, by increasing number of measurements, measurement accuracy can be improved by averaging the many measurement results.

Embodiment 8

Figure 12:
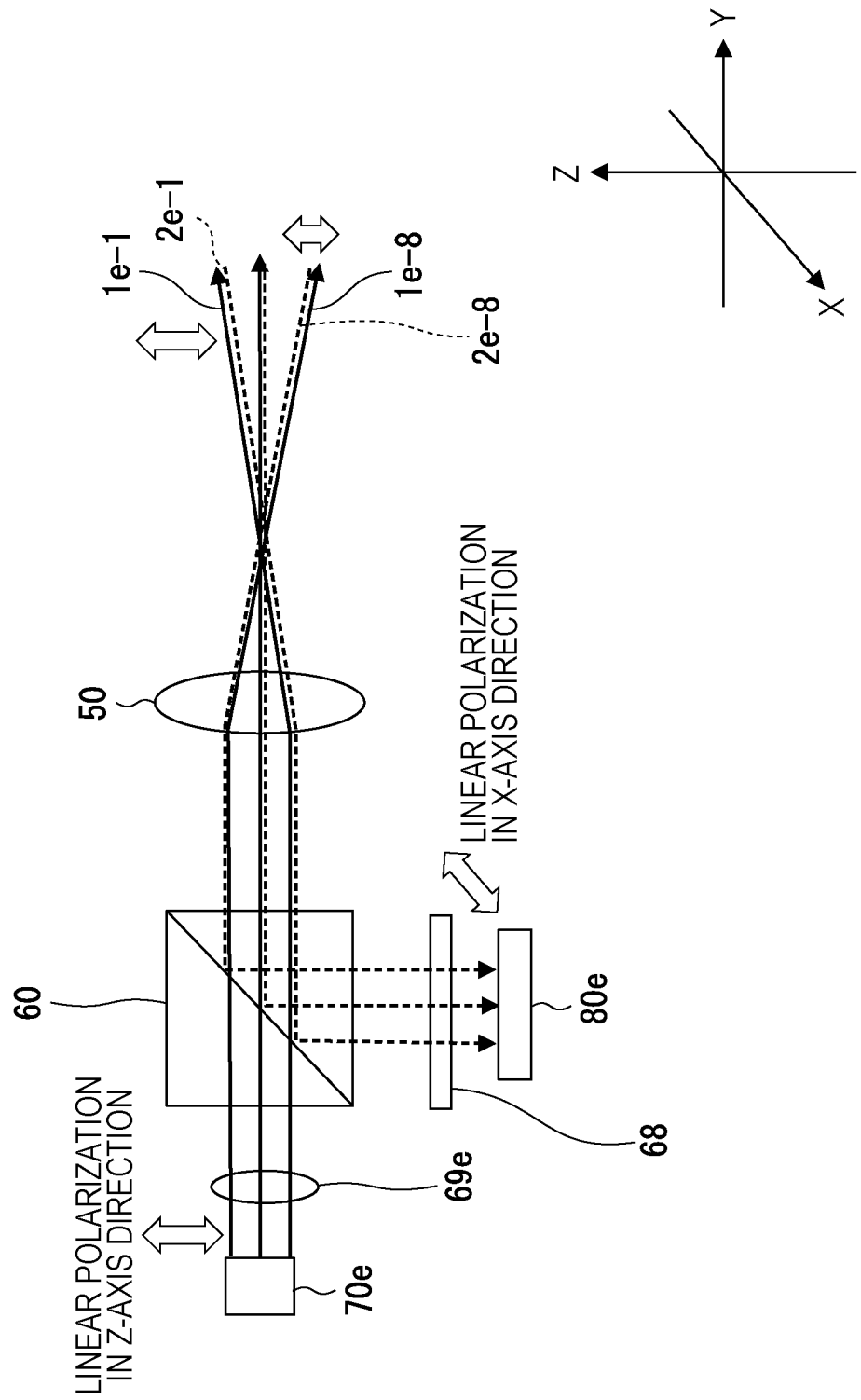
FIG. 12 is a schematic drawing depicting a pulsed light irradiation/detection unit of an optical radar device according to embodiment 8 of the present disclosure.

FIG. 12 depicts a pulsed light irradiation/detection unit 10*e* according to embodiment 8. An optical radar device 100*e* according to embodiment 8 has a configuration similar to that of the optical radar device 100*c* according to embodiment 6, and a difference is that the pulsed light irradiation/detection unit 10*e* does not have a quarter-wave plate. Consequently, pulsed light 1*e*-1 to 8 is linearly polarized in the Z-axis direction depicted in FIG. 12. Reflected light 2*e*-1 to 8 received by a light receiving element 80*e* is linearly polarized in the X-axis direction depicted in FIG. 12. In other words, the polarization direction of the pulsed light and the polarization direction of the reflected light are orthogonal. In other respects, the optical radar device 100*e* according to the present embodiment is similar to the optical radar device 100*c* according to embodiment 6.

The amount of light received by the light receiving element 80*e* decreases by approximately half compared to the case of the optical radar device 100*c* according to embodiment 6; however, the amount of background light received decreases in a similar manner, and therefore the SN ratio itself does not deteriorate greatly. In the present embodiment, it is preferable to improve the SN ratio by additional sensitivity improvement such as increasing the area of the light detection parts of the light receiving element 80*e* and increasing quantum efficiency. According to the present embodiment, mirror surface reflection light of the pulsed light 1*e*-1 to 8 can be cut. It is thereby possible to exclude the effect of precipitation like raindrops, fog, or snow, which have a high mirror surface reflection intensity.

Embodiment 9

Figure 13:
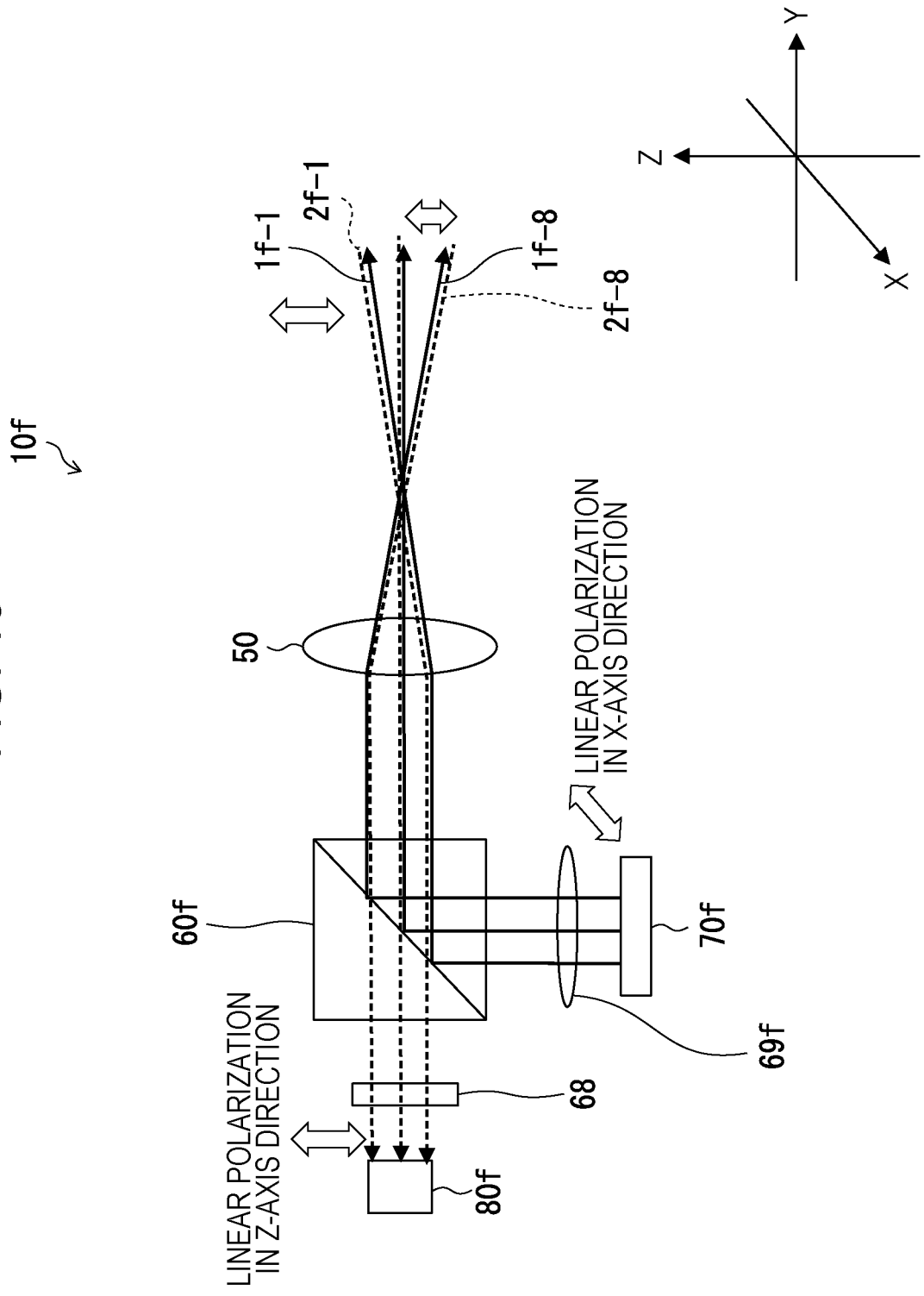
FIG. 13 is a schematic drawing depicting a configuration pertaining to a pulsed light irradiation/detection unit of an optical radar device according to embodiment 9 of the present disclosure.

FIG. 13 depicts an optical radar device 100f according to embodiment 9 The optical radar device 100f according to embodiment 9 has a configuration similar to that of the optical radar device 100e according to embodiment 8, and, as depicted in FIG. 13, a difference is that the arrangement of a light receiving element 80f and a pulsed light emitting element 70f has been switched. Consequently, the pulsed light emitting element 70f is arranged orthogonal to the Z axis, and the light receiving element 80f is arranged orthogonal to the Y axis. The pulsed light emitting element 70f emits light that is linearly polarized in the X-axis direction, and pulsed light f-1 to 8 is linearly polarized in the direction parallel with the X axis Reflected light 2f-1 to 8 received by the light receiving element 80f is linearly polarized in the Z-axis direction. However, if the pulsed light emitting element 70c depicted in FIGS. 8A and 8B is applied to FIG. 13, its emission are linearly polarized in the Y-axis direction.

Therefore the structure depicted in FIGS. 14A, 14B, and 14C was adopted for the pulsed light emitting element 70f.

A difference between the present embodiment and embodiment 8 is that the polarization direction for the linear polarization of the received reflected light 2f-1 to 8 is the Z-axis direction. Under strong sunlight, the optical radar device 100f receives very strong reflected sunlight coming from various objects on roads such as oncoming vehicles. This kind of reflected light is linearly polarized mainly in a horizontal direction when the solar altitude is high. Consequently, since the optical radar device 100f detects reflected light 2f-1 to 8 that is linearly polarized in a vertical direction, such horizontally polarized sunlight reflection can be excluded and the SN ratio can be significantly improved.

In the pulsed light emitting element 70f, a plurality of laser chips 95-m are mounted on substrates 90-m and are secured to a frame body 96 at pitches R, as depicted in FIGS. 14A and 14B. FIG. 14C depicts an enlarged view of each light emitting element. The laser chips 95-m are edge emitting lasers. N-wiring 91-m and P-wiring 92-m is arranged on the substrates 90-m in the longitudinal direction (Z-axis direction) of the substrates 90-m, and edge emitting laser chips are connected face down thereon with a connection material 93 interposed. In the edge emitting laser chips, an N-layer 71f-m including a GaAs substrate, a light emitting layer 72f-m, and a P-layer 73f-m are laminated, as depicted in FIG. 14C. An N-electrode 75f-m is formed in two places, one being on the N-layer 71f-m, which is exposed by a portion of an epitaxial growth surface being etched to the N-layer 71f-m, and the other being the surface of the opposite side of the N-layer 71f-m. A P-electrode 76f-m is formed on a ridge 77f-m that is formed in a region of the P-layer 73f-m. The surfaces other than portions where the N-electrode 75f-m and the P-electrode 76f-m connect with a semiconductor layer are coated by an insulating film 74f-m. The ridge 77f-m portion of the light emitting layer 72f-m constitutes a light emitting part 78f-m. At the rear depicted in FIG. 14B, although not illustrated, the N-wiring 91-m and the P-wiring 92-m is connected to external driving circuits. Note that, in a case where the substrates 90-m are enlarged, some or all of the driving circuits for the laser chips 95-m can be included.

The laser chips 95-m have a lateral width of 250 μm, a length of 500 μm, and a thickness of 100 μm. The substrates 90-m have a thickness of 100 μm, a width of 1500 μm, and a length of 2000 μm. The pitches R are 350 μm.

FIGS. 14A, 14B, and 14C depict a configuration in which edge emitting laser chips are implemented in modules as the pulsed light emitting element 70f; however, eight surface emitting laser chips may be monolithically formed being arranged side-by-side in a linear shape (Y-axis direction) at the pitches R. In doing so, a plurality of light emitting parts constituting individual surface emitting lasers are configured in such a way as to emit linearly polarized light in the X-axis direction.

Embodiment 10

An optical radar device according to embodiment 10 has a configuration similar to that of the optical radar device 100c according to embodiment 6; however, a difference is that a pulsed light irradiation/detection unit 10g uses an off-axis reflective mirror 55 instead of the lens 50 as an imaging optical element.

Figure 15:
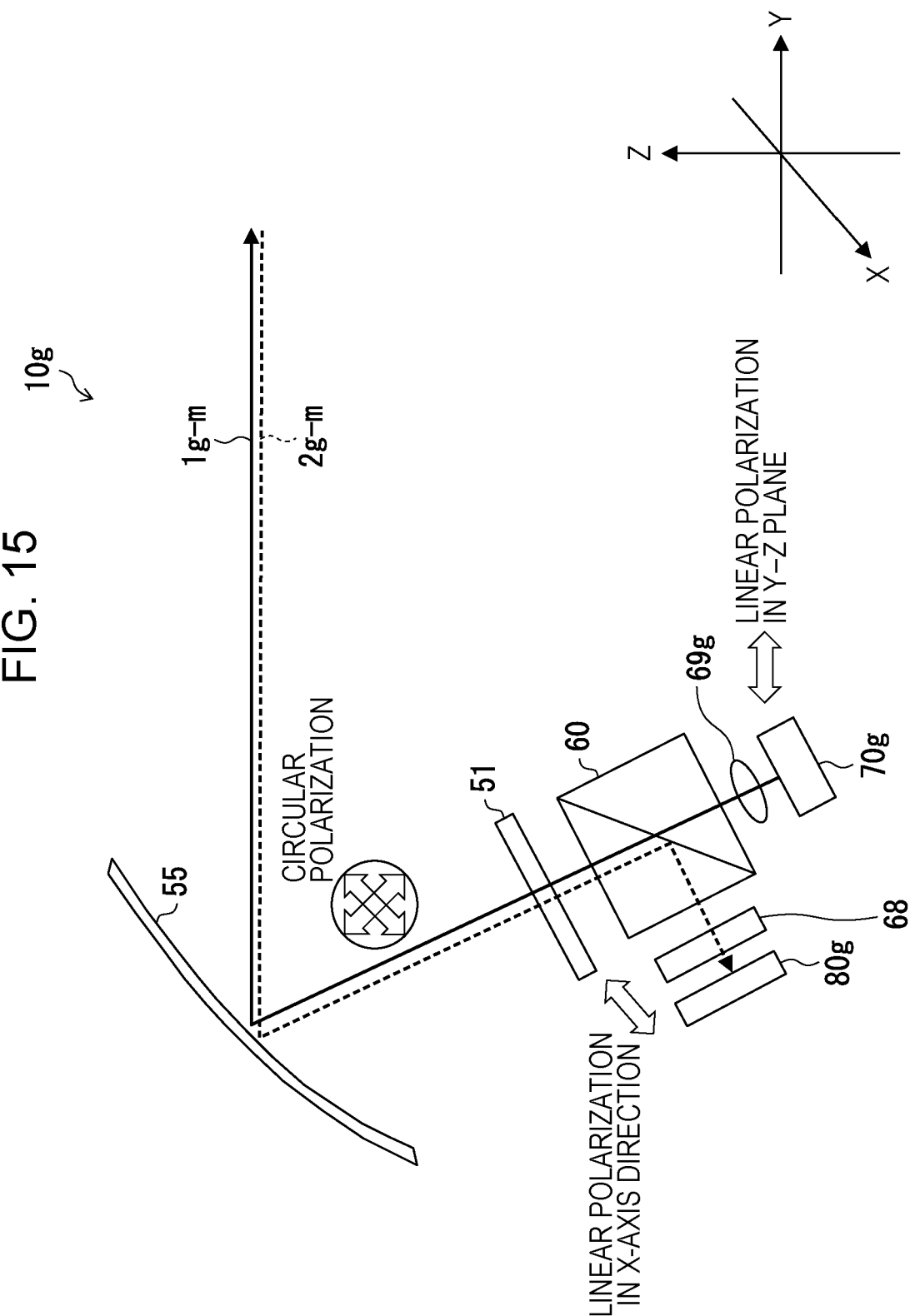
FIG. 15 is a schematic drawing depicting a configuration pertaining to a pulsed light irradiation detection unit of an optical radar device according to embodiment 10 of the present disclosure.

FIG. 15 is a schematic drawing of the pulsed light irradiation/detection unit 10g according to embodiment 10. A pulsed light emitting element 70g is installed at the focal position of the off-axis reflective mirror 55 with the quarter-wave plate 51, the polarizing beam splitter 60, and a shaping lens 69g interposed. Furthermore, a light receiving element 80g is installed at the focal position of the off-axis reflective mirror 55 with the quarter-wave plate 51, the polarizing beam splitter 60, and the optical bandpass filter 68 interposed.

In the present embodiment, the off-axis reflective mirror 55 constituting an imaging optical element is shared by the irradiation system and the light receiving system and the optical axes of both systems overlap, and it is therefore possible to suppress the occurrence of blind spots and also to keep the divergence of pulsed light 1g-m to a minimum and extend the maximum measurement distance. In addition, the pulsed light irradiation/detection unit 10g has plurality of light emitting parts and a plurality of light detection parts to improve angular resolution, and manufacturing method is particularly easy.

Embodiment 11

Figure 16:
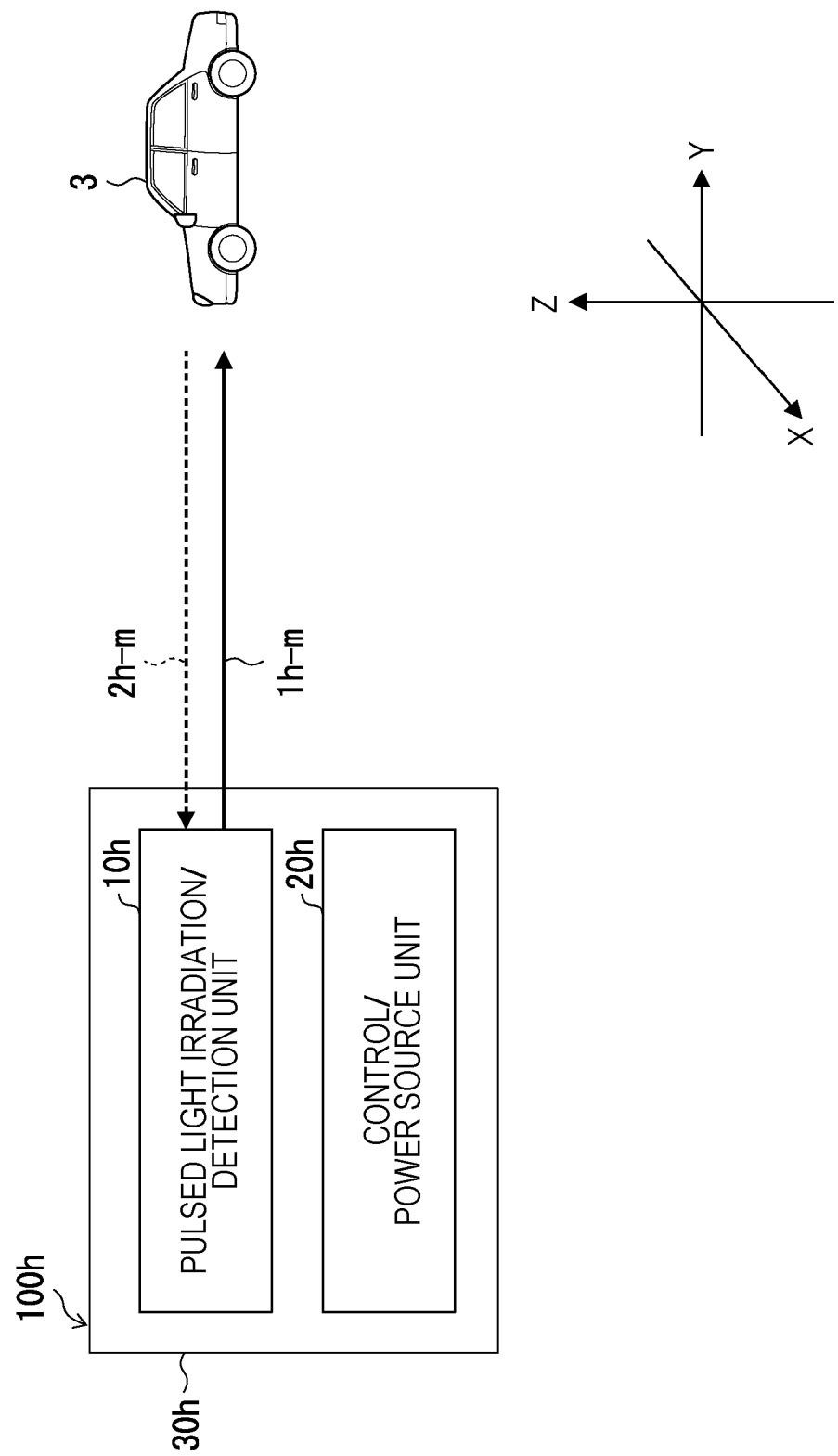
FIG. 16 is a schematic drawing depicting a configuration of an optical radar device according to embodiment 11 of the present disclosure.

FIG. 16 is a schematic drawing of an optical radar device 100h according to embodiment 11. The optical radar device 100h according to embodiment 11 is different from the optical radar devices according to the aforementioned embodiments in that a pulsed light irradiation/detection unit 10h includes a pulsed light scanning function.

As depicted in FIG. 16, the optical radar device 100h includes the pulsed light irradiation/detection unit 10h, a control power source unit 20h, and a casing 30h, but may not include a pulsed light scanning function such as that of a rotation mechanism or a reflective mirror.

Figure 17:
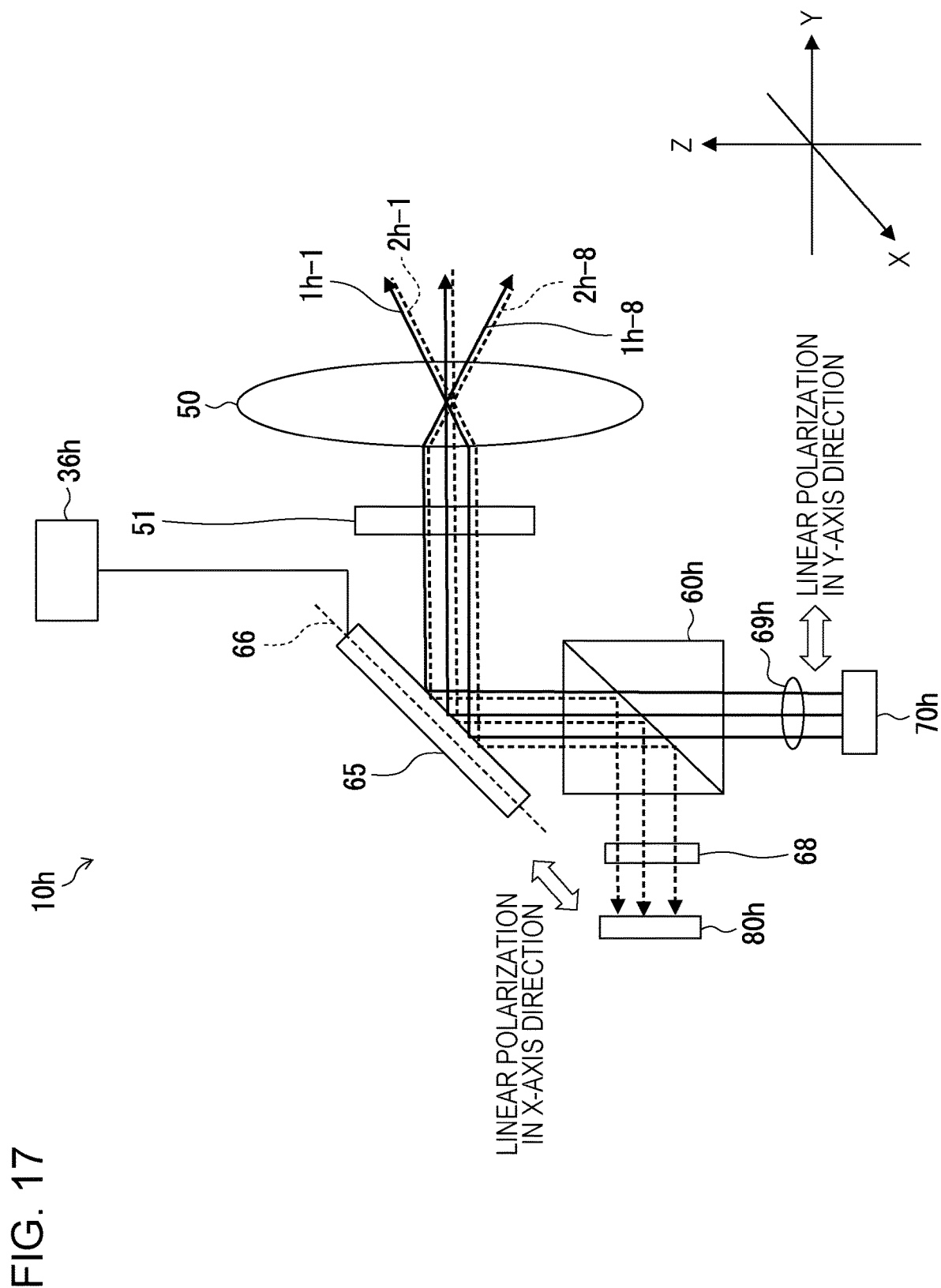
FIG. 17 is a schematic drawing depicting a configuration pertaining to a pulsed light irradiation/detection unit of the optical radar device according to embodiment 11 of the present disclosure.

FIG. 17 depicts a configuration of the pulsed light irradiation/detection unit 10h according to embodiment 11. There is a reflective mirror 65 that is a movable mirror between the polarizing beam splitter 60 and the lens 50 constituting an imaging optical element, and it is thereby possible for the direction of pulsed light 1h-m to be altered within the X-Y plane. Even in a case where a scanning function is incorporated into the pulsed light irradiation/detection unit 10h as in the present embodiment, the lens 50 is shared by the irradiation system and the light receiving system and the optical axes of both systems overlap, and it is thereby possible to suppress the occurrence of blind spots. Furthermore, the divergence of the pulsed light 1 can be kept to a minimum and the maximum measurement distance can be extended. In addition, due to having a plurality of light emitting parts and a plurality of light detection parts, as well as it being possible to have angular resolution in the Z-axis direction, it becomes possible to scan within the X-Y plane, and two-dimensional measurement can be performed without using a rotation mechanism driven by a motor, a large mirror, or the like.

Apart from having the reflective mirror 65 and a mirror driving unit 36h that controls the angle of rotation of the reflective mirror 65, and apart from the optical path being changed by 90 degrees by the reflective mirror 65, the pulsed light irradiation/detection unit 10h is similar to the 10c according to embodiment 6. The reflective mirror 65 can rotate about a rotation axis 66 that intersects the Z axis at 45 degrees within the Z-Y plane for example and scan the pulsed light 1h-m in the X-axis direction. By changing the optical path, the arrangement of the polarizing beam splitter 60 is also changed by 90 degrees, a pulsed light emitting element 70h is arranged perpendicular to the Z axis, and a light receiving element 80h is arranged perpendicular to the Y axis. The quarter-wave plate 51 is arranged between the reflective mirror 65 and the lens 50 in FIG. 17 but may be arranged between the reflective mirror 65 and the polarizing beam splitter 60.

In a case where the rotation range of the reflective mirror 65 is ±G (degrees) and the central position of a reflective surface of the reflective mirror 65 is in a position having an optical path length k from the focal position of the lens 50, the scanning range of tree pulsed light 1h-m becomes approximately k/f·G. Consequently, in a case where there is a desire for the reflective mirror 65 to have a wide scanning range, it is preferable for the reflective mirror 65 to be placed in the vicinity of the lens 50. For example, the scanning range becomes ±15 degrees in a case where G=20 degrees, k=30 mm, and a lens 50 is used with F=1.8 (an optical aperture of 22.2 mm) and a focal length of 40 mm, which is the same as in embodiment 6. In this case, it is desirable for the reflective surface of the reflective mirror 65 to be an elliptical surface having a minor axis of 17 mm and a major axis of 24 mm approximately. In the present configuration, it is difficult to scan a wide range as with the optical radar device 100c; however, it is possible to provide a small optical radar device that is capable of measuring a two-dimensional region while having a comparatively small scanning area. In a case where the scanning area may be further narrowed, the scanning speed can be increased and costs decreased by separating the reflective mirror 65 from the lens 50 as much as possible and reducing the area of the reflective mirror 65.

Embodiment 12

Figure 18:
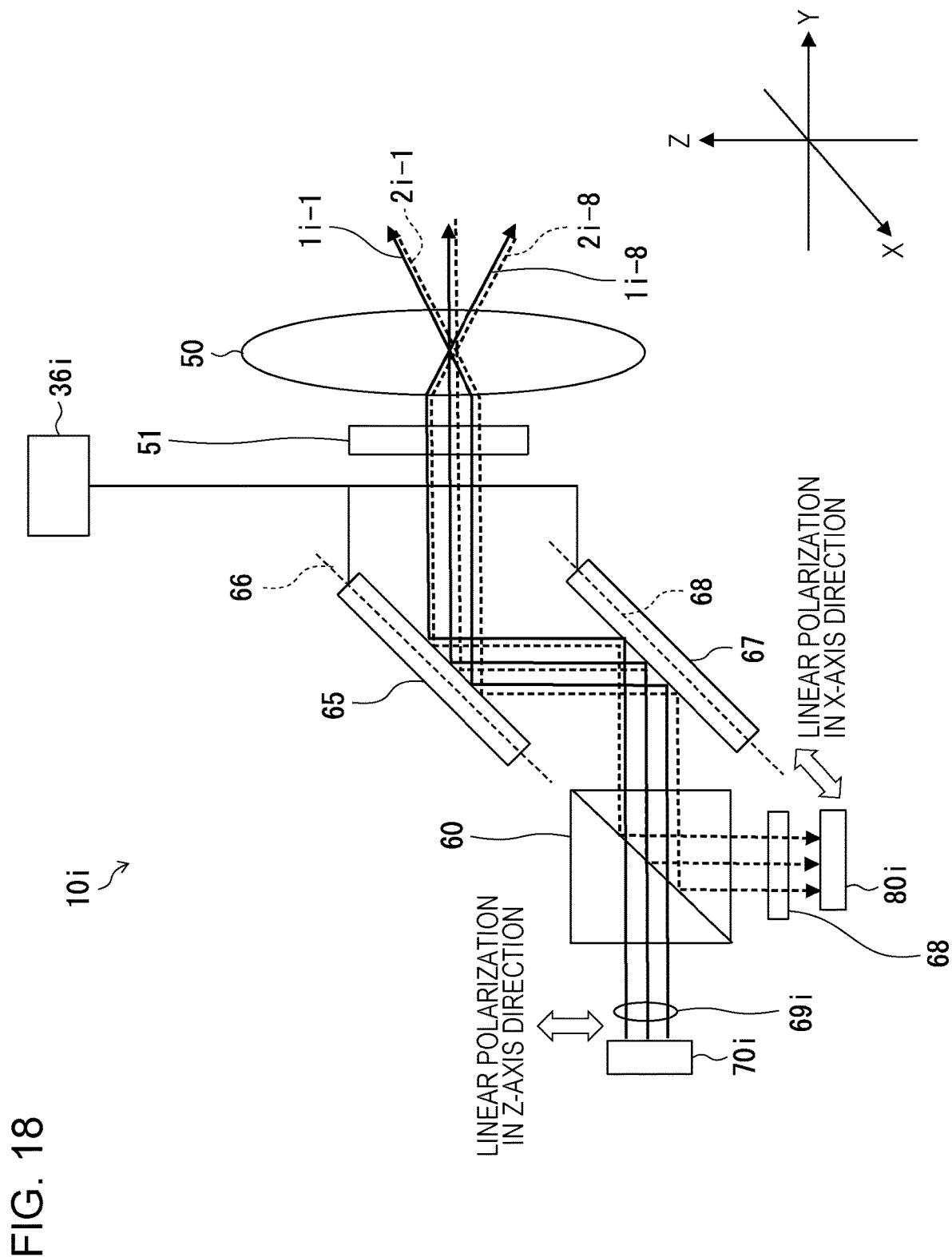
FIG. 18 is a schematic drawing depicting a configuration pertaining to a pulsed light irradiation/detection unit of an optical radar device according to embodiment 12 of the present disclosure.

FIG. 18 depicts a configuration of a pulsed light irradiation/detection unit 10i according to embodiment 12. The pulsed light irradiation/detection unit 10i according to embodiment 12 is different from the pulsed light irradiation/detection unit 10h according to embodiment 11 in that there are a plurality of reflective mirrors. Owing to this difference, the pulsed light scanning area can be increased.

In the present embodiment, a plurality of reflective mirrors are included, namely a reflective mirror 67 is added to the reflective mirror 65. A rotation axis 68 of the reflective mirror 67 is parallel with the rotation axis 66 of the reflective mirror 65. To make the scanning area wider, the reflective mirror 65 can be tilted additionally with the reflective mirror 67 tilted to its maximum angle.

SUMMARY

A pulsed light irradiation/detection device (pulsed light irradiation/detection unit 10) according to aspect 1 of the present disclosure is provided with: an imaging optical element (lens 50); a polarizing bears splitter 60; a pulsed light emitting element 70; and a light receiving element 80, pulsed light 1 being radiated toward a target object 3 and reflected light 2 from the target object 3 being received, in which the pulsed light emitting element 70 emits pulsed light that is linearly polarized in a first polarization direction, the pulsed light 1 passes through the polarizing beam splitter 60 and the imaging optical element (lens 50) in this order, and is radiated onto the target object 3, the reflected light 2 passes through the imaging optical element (lens 50) and the polarizing beam splitter 60 in this order, is linearly polarized in a second polarization direction that is different from the first polarization direction, and is concentrated on the light receiving element 80, the pulsed light emitting element 70 and the light receiving element 80 are provided on a focal plane of the imaging optical element (lens 50), and the optical axis of the pulsed light 1 and the optical axis of the reflected light 2 overlap.

According to the aforementioned configuration, the occurrence of blind spots can be suppressed, and the intensity of light radiated onto the target object can be Increased with fewer optical components and regardless of the distance to the target object.

In a pulsed light irradiation/detection device (pulsed light irradiation/detection unit 10) according to aspect 2 of the present disclosure, in the aforementioned aspect 1, the size of a light detection part 81 of the light receiving element 80 and the size of a light emitting part of the pulsed light emitting element 70 may be approximately equal, or the size of the light detection part of the light receiving element may be less than the size of the light emitting part of the pulsed light emitting element.

According to the aforementioned configuration, even if the target object 3 is a long distance away, it is possible for the irradiation region of pulsed light on the target object 3 to cover a light detection region in a non-wasteful manner.

In a pulsed light irradiation/detection device (pulsed light irradiation/detection unit 10c) according to aspect 3 of the present disclosure, in the aforementioned aspect 1, the pulsed light emitting element 70c may have a plurality of light emitting parts 78, the light receiving element 80c may have a plurality of light detection parts 81, and each of the plurality of light emitting parts 78 may correspond one-to-one with any of the plurality of light detection parts 81.

According to the aforementioned configuration, angular resolution is improved.

In a pulsed light irradiation/detection device (pulsed light irradiation/detection unit 10) according to aspect 4 of the present disclosure, in the aforementioned aspect 3, each of the plurality of light detection parts 81 may have a size that is approximately equal to the size of a light emitting part of the corresponding light emitting part 78, or that is less than the size of the light emitting part of the corresponding light emitting part.

According to the aforementioned configuration, a similar effect to that of aspect 2 is demonstrated.

In a pulsed light irradiation/detection device (pulsed light irradiation/detection unit 10) according to aspect 5 of the present disclosure, in the aforementioned aspect 3 or 4, The arrangement pitches of the plurality of light detection parts 81 may be uniform.

According to the aforementioned configuration, the resolution becomes uniform.

In a pulsed light irradiation/detection device (pulsed light irradiation/detection unit 10) according to aspect 6 of the present disclosure, in the aforementioned aspects 3 to 5, the plurality of light emitting parts 78 in the pulsed light emitting element 70 may be monolithically integrated.

According to the aforementioned configuration, manufacturing can be performed with high precision.

In a pulsed light irradiation/detection device (pulsed light irradiation/detection unit 10) according to aspect 7 of the present disclosure, in the aforementioned aspects 3 to 6, the light receiving element 80 may have a plurality of measurement circuits 83, and each of the plurality of measurement circuits 83 may correspond with any of the plurality of light detection parts 81.

According to the aforementioned configuration, the measurement time can be shortened, and, in a case where the number of times that measurement is performed is increased, measurement precision can be improved.

In a pulsed light irradiation/detection device (pulsed light irradiation/detection unit 10) according to aspect 8 of the present disclosure, in the aforementioned aspects 1 to 7, a quarter-wave plate 51 that circularly polarizes the pulsed light may be provided between the polarizing beam splitter 60 and the target object 3, and the pulsed light may be radiated toward the target object 3 in a circularly polarized state.

According to the aforementioned configuration, reflection loss in the polarizing beam splitter 60 is low.

In a pulsed light irradiation/detection device (pulsed light irradiation/detection unit 10) according to aspect 9 of the present disclosure, in the aforementioned aspects 1 to 7, the pulsed light 1 may be radiated toward the target object 3 in a linearly polarized state.

According to the aforementioned configuration, light loss is low.

In a pulsed light irradiation/detection device (pulsed light irradiation/detection unit 10) according to aspect 10 of the present disclosure, in the aforementioned aspects 1 to 9, a movable mirror may be included between the polarizing beam splitter 60 and the imaging optical element (lens 50).

According to the aforementioned configuration, the direction of pulsed light 1 can be altered within a horizontal plane.

In a pulsed light irradiation/detection device (pulsed light irradiation/detection unit 10) according to aspect 11 of the present disclosure, in the aforementioned aspects 1 to 10, the imaging optical element may be a lens 50.

According to the aforementioned configuration, parallel light can be implemented.

In a pulsed light irradiation/detection device (pulsed light irradiation/detection unit 10) according to aspect 12 of the present disclosure, in the aforementioned aspects 1 to 11, the pulsed light emitting element 70 may have a shaping lens 69.

According to the aforementioned configuration, divergence in the Z-axis direction can be suppressed as well as divergence in the X-axis direction.

In a pulsed light irradiation/detection device (pulsed light irradiation/detection unit 10) according to aspect 13 of the present disclosure, in the aforementioned aspects 1 to 12, an optical bandpass filter 68 may be included between the polarizing beam splitter 60 and the light receiving element 80.

According to the aforementioned configuration, it is possible to improve the SN ratio by reducing components of the reflected light 2 that are generated by background light not relevant to the pulsed light 1.

In a pulsed light irradiation/detection device (pulsed light irradiation/detection unit 10) according to aspect 14 of the present disclosure, in the aforementioned aspects 1 to 13, the pulsed light emitting element 70 may emit near-infrared pulsed light.

According to the aforementioned configuration, the emitted light is not visible to the human eye, and therefore is not obstructive and is safer for the eyes of animals as the wavelength becomes longer.

The present disclosure is not restricted to the aforementioned embodiments, various alterations are possible within the scope indicated in the claims, and embodiments obtained by appropriately combining the technical features disclosed in each of the different embodiments are also included within the technical scope of the present disclosure. In addition, novel technical features can be formed by combining the technical features disclosed in each of the embodiments.

Example 1

An example of the present disclosure will be described hereinafter.

In the configuration hereinafter, the maximum measurement distance of the optical radar device according to embodiment 1 was obtained. The pulsed light emitting element 70 had a light emission wavelength of 905 nm, a peak power of 31 W, and a pulse width of 6 nsec. The size of the light emitting part of the edge emitting laser chip was P=200 μm and U=10 μm. The divergence angles of light in the near field were 10 degrees in the X-axis direction and 25 degrees in the Z-axis direction. The light detection part of the light receiving element 80 was an avalanche photodiode having a diameter of 230 μmϕ and a sensitivity of 55 A/W. An interference filter having a transmission band central wavelength of 905 nm and a transmission bandwidth of 45 m was used as the optical bandpass filter 68. The lens 50 was an F2.8 (an optical aperture of 26.8 mm) lens having a focal length of 75 mm, and the divergence angle of pulsed light after passing through the lens 50 was approximately 0.15 degrees. For the polarizing beam splitter 60, a cube type having single side length of 15 mm was used, and the center thereof was installed in a position 40 mm from the lens 50. The light receiving element 80 was installed at the focal position of the lens 50 with the optical bandpass filter 68, the quarter-wave plate 51, and the polarizing beam splitter 60 interposed. Similarly, the pulsed light emitting element 70 was installed at the focal position of the lens 50 with the shaping lens 69, the quarter-wave plate 51, and the polarizing beam splitter 60 interposed. A plate having a reflectance of 50% was used as the target object 3, and measurement was performed in fair weather.

The output current of the avalanche photodiode included a dark current of 0.6 nA, a background current of 1.3 μA, and a current of 11 μA brought about by the reflected light 2 from the target object 3 at a distance of 120 m, which was sufficiently high compared to the background current for the reflected light 2 to be detected. The obtained time-of-flight ToF was 799 nsec, which matched the correct distance within an error range. Furthermore, the light detection part of the light receiving element 80 was circular, which did not match the shape of the light emitting part of the pulsed light emitting element 70, and therefore a metal mask having a 30-μm wide strip-shaped opening was installed in front of the center of the light detection part in this case, the current brought about by the reflected light 2 did not change; however, the background current decreased to 0.2 μA and the SN ratio improved. It was thereby possible to extend the maximum measurement distance to 180 m.

Comparative Example

Figure 19:
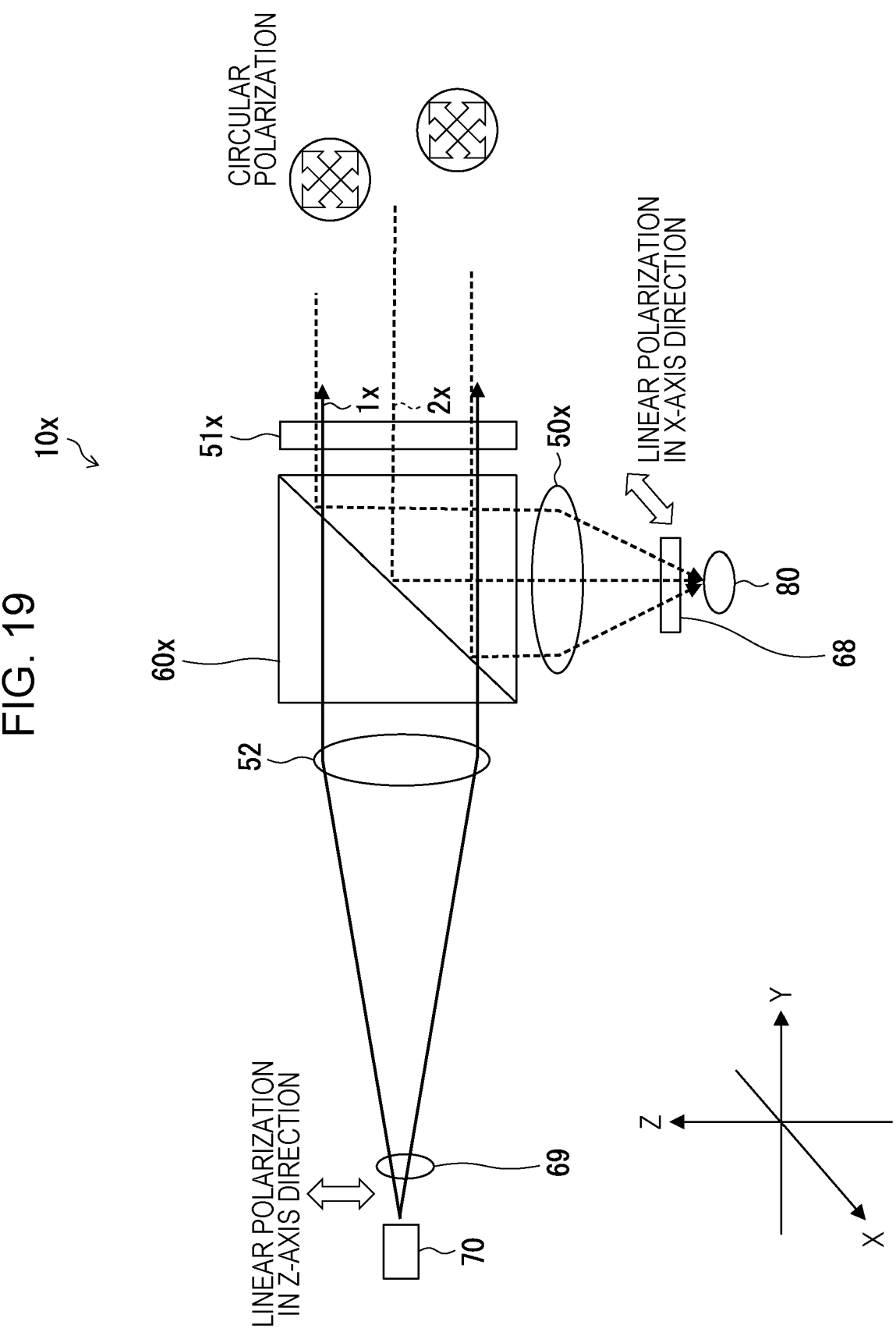
FIG. 19 is a schematic drawing depicting a configuration pertaining to a comparative example of an optical radar device according to example 1 of the present disclosure.

In contrast to example 1, a configuration is also possible in which an imaging optical element is not shared between the irradiation system and the light receiving system, similar to a pulsed light irradiation/detection unit 10x depicted in FIG. 19. Specifically, the light receiving system includes a light receiving lens 50x, and the irradiation system includes a collimator lens 52 with a polarizing beam splitter 60x and a quarter-wave plate 51x being arranged in front thereof. According to this configuration, the optical axes of pulsed light 1x and received reflected light 2x are aligned, and it is possible to suppress the occurrence of blind spots. However, in order to capture the reflected light 2x from a distant target object 3, the diameter of the light receiving lens 50x should be large. And in accordance with the diameter of the light receiving lens 50x, the polarizing beam splitter 60x and a quarter-wave plate 51x are also enlarged and therefore these optical elements become expensive and consume a large space. In this comparative example configuration, spaces proportional to the focal length of the light receiving lens 50x and the collimator lens 52 are necessary behind the polarizing beam splitter 60x. Consequently, the pulsed light irradiation/detection unit 10x inevitably becomes a large and expensive component. In comparison, in the configuration of example 1, there is a benefit in that there are fewer components, the cost for the components is less, and the configuration can thereby be made more compact.

Example 2

Another example of the present disclosure will be described hereinafter.

In the next configuration, the maximum measurement distance of the optical radar device 100c according to embodiment 6 was obtained. In the pulsed light emitting element 70c, the width of the ridges 77-1 to 8 was 200 µm, the ridge arrangement pitches were R=350 µm, the light emission wavelength of each light emitting part 78-1 to 8 was 905 nm±1 nm, and the peak power was 31 W±1 W. Driving was performed with a pulse width of 6 nsec. One rod lens was used as the shaping lens 69c, which was arranged in front of the light emitting layer 72. The divergence angle of light emitted from a laser chip was 10 degrees in both the X-axis direction and the Z-axis direction. The light receiving element 80c was formed on a silicon substrate, and the light detection parts 81-1 to 8 were arranged with R=350 µm, the same arrangement pitches as the light emitting parts. For the light detection parts 81-m, 128 SPADs having diameters of 4 µm were arranged. The SPADs were arranged in a square-shaped region having a single side of 144 µm. The SPAD quantum efficiency was 15% and the dead time was 20 µsec. An interference filter having a transmission band central wavelength of 905 nm and a transmission bandwidth of 45 nm was used as the optical bandpass filter 68. The lens 50 was an F1.8 (an optical aperture of 22.2 mm) lens having a focal length of 40 mm. For the polarizing beam splitter 60, a cube type having single side length of 15 mm was used, and the center thereof was installed in a position 20 mm from the lens 50. The light receiving element 80c was installed at the focal position of the lens 50 with the optical bandpass filter 68, the quarter-wave plate 51, and the polarizing beam splitter 60 interposed. Similarly, the pulsed light emitting element 70c was installed at the focal position of the lens 50 with the shaping lens 69c, the quarter-wave plate 51, and the polarizing beam splitter 60 interposed. The divergence angle of the pulsed light after having passed through the lens 50 was approximately 0.29 degrees. Pulsed light 1-1 to 8 from the light emitting parts 78-1 to 8 was respectively emitted at deflection angles of +1.0 degree, +0.5 degrees, 0 degrees, −0.5 degrees, −1.0 degree, −1.5 degrees, −2.0 degrees, and −2.5 degrees at the Z axis side, with respect to the Y-axis direction. The light detection parts 81-1 to 8 received reflected light 2-1 to 8 for the pulsed light 1-1 to 8. The light emitting parts 78-1 to 8 emitted light sequentially, and the light detection parts 81-1 to 8 sequentially received Light in correspondence therewith. Consequently, one pair of a light emitting part and a light detection part is activated at one time. A power source was supplied by the light detection control units 82-m to the SPADs of the light detection parts 81-m selected by the control/IO/power source unit 84, in accordance with a signal from the control/power source unit 20c. The light detection control units 82-m aggregated the pulse output from each SPAD in units of 3 nsec (half the pulse width of the pulsed light), and sent the result to the measurement circuit 83. The measurement circuit 83 recorded the number of photons counted each 3 nsec in a memory, and meanwhile performed data processing for identifying signals caused by background light and signals produced by the pulsed light 1-m, and determined the time-of-flight.

Figure 10:
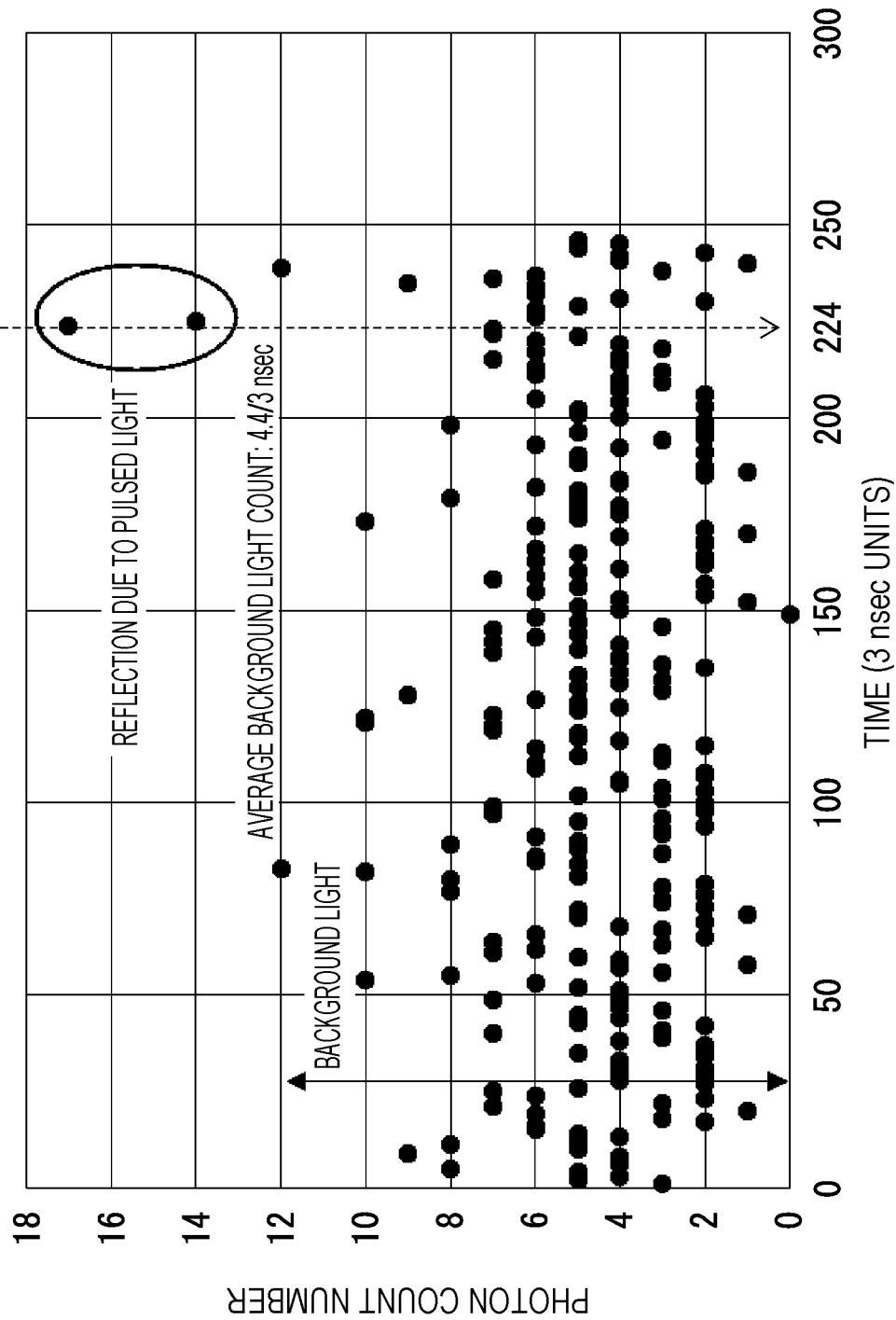
FIG. 10 is a drawing depicting measurement results in the optical radar device according to embodiment 6 of the present disclosure.

An example of data for a site at 100 m recorded by the measurement circuit 83 is depicted in FIG. 10. In this example, the number of counts was significantly increased above background light signal level at 224×3 nsec after the emission of pulsed light, and a time-of-flight ToF of 669 nsec and distance of 100.35 m were measured, which coincided well with actual values. The upper limit level for background light was estimated at approximately 12 in accordance with the Poisson distribution from the overall average number of counts of 4.4, and therefore a count that exceeded 12 was determined as being reflected light from pulsed light caused by the target object 3. Various schemes can be adopted as the method for determining the time-of-flight. For example, due to the measurement results of FIG. 10 being added for adjacent periods and being reviewed as data for 6-nsec segments, it becomes easy to detect a distant object although the distance resolution does decline. With this kind of improvement, in the present configuration, it was possible to extend the maximum measurement distance to 130 m.

By sequentially repeating measurements such as the aforementioned, measurements for eight points can be performed all at once. In this case, although the angular resolution in the Z-axis direction was 0.5 degrees, with this resolution, an angular resolution approximately equal to R/f (rad) can be controlled by means of the focal length f of the lens 50 and the pitches R of the light emitting parts and the light detection parts. The angular resolution can be reduced by using a lens having a lone focal length.

The present disclosure contains subject matter related to that disclosed in Japanese Priority Patent Application JP 2017-205599 filed in the Japan Patent Office on Oct. 24, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A pulsed light irradiation/detection device comprising:
an imaging optical element;
a polarizing beam splitter;
a pulsed light emitting element; and
a light receiving element,
pulsed light being radiated toward a target object and reflected light from the target object being received,
wherein the pulsed light emitting element emits pulsed light that is linearly polarized in a first polarization direction,
the imaging optical element functions as a collimator lens with respect to the pulsed light,
the pulsed light passes through the polarizing beam splitter and the collimator lens in this order, and is radiated onto the target object, on which a diameter of the pulsed light increases as a distance between the target object and the collimator lens increases,
the reflected light passes through the collimator lens and the polarizing beam splitter in this order, is linearly polarized in a second polarization direction that is different from the first polarization direction, and is concentrated on the light receiving element,
the pulsed light emitting element and the light receiving element are provided on a focal plane of the imaging optical element, and
an optical axis of the pulsed light and an optical axis of the reflected light overlap.

2. The pulsed light irradiation/detection device according to claim 1,
wherein a size of a light detection part of the light receiving element and a size of a light emitting part of the pulsed light emitting element are equal, or the size of the light detection part of the light receiving element is less than the size of the light emitting part of the pulsed light emitting element, and
the light detection part is a light sensitive area of the light receiving element and the light emitting part emits the pulsed light.

3. The pulsed light irradiation/detection device according to claim 1,
wherein the pulsed light emitting element has a plurality of light emitting parts, the light receiving element has a plurality of light detection parts, and each of the plurality of light emitting parts corresponds one-to-one with any of the plurality of light detection parts.

4. The pulsed light irradiation/detection device according to claim 3,
wherein each of the plurality of light detection parts has a size that is equal to a size of the corresponding light emitting part, or that is less than the size of the corresponding light emitting part.

5. The pulsed light irradiation/detection device according to claim 3,
wherein arrangement pitches of the plurality of light detection parts are uniform.

6. The pulsed light irradiation/detection device according to claim 3,
wherein, in the pulsed light emitting element, the plurality of light emitting parts are monolithically integrated.

7. The pulsed light irradiation/detection device according to claim 3,
wherein the light receiving element has a plurality of measurement circuits, and each of the plurality of measurement circuits corresponds with any of the plurality of light detection parts.

8. The pulsed light irradiation/detection device according to claim 1,
wherein a quarter-wave plate that circularly polarizes the pulsed light is provided between the polarizing beam splitter and the target object, and the pulsed light is radiated toward the target object in a circularly polarized state.

9. The pulsed light irradiation/detection device according to claim 1,
wherein the pulsed light is radiated toward the target object in a linearly polarized state.

10. The pulsed light irradiation/detection device according to claim 1,
wherein a movable mirror is included between the polarizing beam splitter and the imaging optical element and the pulsed light passes through the polarizing beam splitter, the movable mirror and the imaging optical element in this order and the reflected light passes through the imaging optical element, the movable mirror and the polarizing beam splitter in this order.

11. The pulsed light irradiation/detection device according to claim 1,
wherein the imaging optical element is a lens.

12. The pulsed light irradiation/detection device according to claim 1,
wherein the pulsed light emitting element has a shaping lens, wherein the shaping lens brings a cross-sectional shape of the pulsed light to be a predetermined shape.

13. The pulsed light irradiation/detection device according to claim 1,
wherein an optical bandpass filter is included between the polarizing beam splitter and the light receiving element.

14. The pulsed light irradiation/detection device according to claim 1,
wherein the pulsed light emitting element emits near-infrared pulsed light.

15. An optical radar device comprising the pulsed light irradiation/detection device according to claim 1,
wherein a time-of-flight is measured in accordance with radiation of pulsed light, produced by the pulsed light irradiation/detection device, toward a target object, and detection of reflected light from the target object.

* * * * *